(12) United States Patent
Jung et al.

(10) Patent No.: US 10,929,291 B2
(45) Date of Patent: Feb. 23, 2021

(54) MEMORY CONTROLLING DEVICE AND COMPUTING DEVICE INCLUDING THE SAME

(71) Applicants: MemRay Corporation, Seoul (KR); YONSEI UNIVERSITY, UNIVERSITY—INDUSTRY FOUNDATION (UIF), Seoul (KR)

(72) Inventors: Myoungsoo Jung, Incheon (KR); Donghyun Gouk, Incheon (KR); Miryeong Kwon, Incheon (KR); SungJoon Koh, Incheon (KR); Jie Zhang, Incheon (KR)

(73) Assignees: MemRay Corporation, Seoul (KR); Yonsei University, University—Industry Foundation (UIF), Seoul (KR)

( * ) Notice: Subject to any disclaimer, the term of this patent is extended or adjusted under 35 U.S.C. 154(b) by 1 day.

(21) Appl. No.: 16/198,972

(22) Filed: Nov. 23, 2018

(65) Prior Publication Data
US 2019/0171566 A1    Jun. 6, 2019

(30) Foreign Application Priority Data

Dec. 6, 2017  (KR) .................... 10-2017-0166935
Oct. 22, 2018  (KR) .................... 10-2018-0126267

(51) Int. Cl.
*G06F 12/0804* (2016.01)
*G06F 12/10* (2016.01)

(52) U.S. Cl.
CPC .......... *G06F 12/0804* (2013.01); *G06F 12/10* (2013.01); *G06F 2212/1044* (2013.01); *G06F 2212/608* (2013.01); *G06F 2212/657* (2013.01)

(58) Field of Classification Search
CPC ............. G06F 12/0804; G06F 12/0864; G06F 12/0871; G06F 12/10; G06F 2212/1024;
(Continued)

(56) References Cited

U.S. PATENT DOCUMENTS

2017/0060434 A1*  3/2017  Chang .................... G06F 3/061
2017/0090780 A1*  3/2017  Anantaraman ....... G06F 3/0685
(Continued)

FOREIGN PATENT DOCUMENTS

KR      20050063653 A      6/2005

OTHER PUBLICATIONS

D. Narayanan and O. Hodson, "Whole-system persistence," ACM SIGARCH Computer Architecture News, vol. 40, No. 1, pp. 401-410, 2012.
(Continued)

*Primary Examiner* — Idriss N Alrobaye
*Assistant Examiner* — Richard B Franklin
(74) *Attorney, Agent, or Firm* — Dinsmore & Shohl LLP

(57) ABSTRACT

A memory controlling device of a computing device including a CPU, a memory, and a flash-based storage device is provided. The memory controlling device includes an address manager and an interface. The address manager aggregates a memory space of the memory and a storage space of the storage device into an expanded memory space, and handles a memory request for the expanded memory space from the CPU by using the memory space of the memory as a cache for the storage space of the storage device. The interface is used to access the memory and the storage device.

20 Claims, 18 Drawing Sheets

(58) Field of Classification Search
CPC ....... G06F 2212/1044; G06F 2212/214; G06F 2212/608; G06F 2212/6082; G06F 2212/657

See application file for complete search history.

(56) References Cited

U.S. PATENT DOCUMENTS

| | | | |
|---|---|---|---|
| 2017/0228190 A1 | 8/2017 | Guddekoppa | |
| 2017/0351626 A1* | 12/2017 | Lalam | G06F 13/4027 |
| 2017/0357604 A1* | 12/2017 | Lim | G06F 3/0607 |
| 2018/0089087 A1* | 3/2018 | Chang | G06F 12/0862 |

OTHER PUBLICATIONS

JEDEC, "Ddr4 nvdimm-n design standard," 2016.
R. Liu, A. Aboulnaga, and K. Salem, "DAX: A Widely Distributed Multi-tenant Storage Service for DBMS Hosting," in VLDB, 2013.
A. Proctor, "NVDIMM: Fastest tier in your storage strategy," 2012, SNIA.
D. J. DeWitt, R. H. Katz, F. Olken, L. D. Shapiro, M. R. Stonebraker, and D. A. Wood, "Implementation techniques for main memory database systems," ACM, 1984.
R. Kallman, H. Kimura, J. Natkins, A. Pavlo, A. Rasin, S. Zdonik, E. P. Jones, S. Madden, M. Stonebraker, Y. Zhang, and J. Hugg, "H-Store: a high-performance, distributed main memory transaction processing system," VLDB, 2008.
H. Garcia-Molina and K. Salem, "Main memory database systems: An overview," IEEE Transactions on Knowledge and Data Engineerin, vol. 4, No. 6, Dec. 1992.
J. Zhao and Y. Xie, "Optimizing bandwidth and power of graphics memory with hybrid memory technologies and adaptive data migration," International Conference on Computer-Aided Design (ICCAD), 2012.
I. Bhati, Z. Chishti, and B. Jacob, "Coordinated Refresh: Energy efficient techniques for dram refresh scheduling," International Symposium on Low Power Electronics and Design (ISLPED), 2013.
The Economist, "The growth of lithium-ion battery power," https://www.economist.com/blogs/graphicdetail/2017/08/daily-chart-8, Aug. 2017.
Micron Technology, "3d xpoint technology," https://www.micron.com/products/advanced-solutions/3d-xpoint-technology, 2015.
Samsung, "Keynote 2: Advancements in SSDs and 3D NAND reshaping storage market," Flash Memory Summit, 2017.
I. Corporation, "Intel SSD 750 series," https://www.intel.com/content/www/us/en/products/memorystorage/solid-state-drives/gaming-enthusiast-ssds/750-series.html, 2015.
J. Axboe, "Flexible io tester," https://github.com/axboe/fio, 2017.
I. Corporation, "Intel core i7-4790k processor," https://ark.intel.com/products/80807, 2014.
I. Corporation, "Intel SSD 535 Series," https://ark.intel.com/products/series/86825/Intel-SSD-535-Series, 2015.
M. Junk, "mmap-benchmark," https://github.com/exabytes18/mmap-benchmark, 2014.
Google, "A light-weight, single-purpose library for persistence with bindings to many platforms," LevelDB, http://leveldb.org/, 2017.
D. Woodhouse, "JFFS: The Journalling Flash File System," OLS, 2001.
C. E. Stevens, "Information technology—at attachment 8-ATA/ATAPI Command set (ATA8-ACS)," ANSI, revision, vol. 18, 2005.
A. Huffman, "NVM Express, revision 1.0 e," Intel Corporation, 2012.
D. S. Standard, "JESD79-4," JEDEC, 2012.
N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 simulator," ACM SIGARCH, vol. 39, No. 2, May 2011.
H. P. Enterprise, "HPE 8GB NVDIMM single rank x4 ddr4-2133 module," https://www.hpe.com/us/en/product-catalog/servers/server-memory/pip.hpe-8gb-nvdimm-single-rank-x4-ddr4-2133-module.1008830324.html, 2018.
Micron, "TN-40-07: Calculating memory power for DDR4 SDRAM," https://www.micron.com/resource-details/868646c5-7ee2-4f6c-aaf4-7599bd5952df, 2017.
S. Li, J. H. Ahn, R. D. Strong, J. B. Brockman, D. M. Tullsen, and N. P. Jouppi, "McPAT: An integrated power, area, and timing modeling framework for multicore and manycore architectures," Microarchitecture, 2009, MICRO-42. 42nd Annual IEEE/ACM International Symposium on, pp. 469-480, IEEE, 2009.
Google, "Leveldb sqlite benchmark, "https://github.com/google/leveldb/tree/master/doc/bench, 2014.
E. Kultursay, M. Kandemir, A. Sivasubramaniam, and O. Mutlu, "Evaluating STT-RAM as an energy-efficient main memory alternative," ISPASS, 2013.
B. C. Lee, E. Ipek, O. Mutlu, and D. Burger, "Architecting phase change memory as a scalable DRAM alternative," ISCA, 2009.
P. Zhou, B. Zhao, J. Yang, and Y. Zhang, "A durable and energy efficient main memory using phase change memory technology," in ISCA, 2009.
I. Corporation, "Intel Optane Memory," https://www.intel.com/content/www/us/en/architecture-and-technology/optane-memory.html, 2017.
M. K. Qureshi, V. Srinivasan, and J. A. Rivers, "Scalable high performance main memory system using phase-change memory technology," ISCA, 2009.
J. C. Mogul, E. Argollo, M. A. Shah, and P. Faraboschi, "Operating system support for NVM+DRAM hybrid main memory.," HotOS, 2009.
R.-S. Liu, D.-Y. Shen, C.-L. Yang, S.-C. Yu, and C.-Y. M. Wang, "NVM duet: Unified working memory and persistent store architecture," ASPLOS, 2014.
A. Sainio, "NVDIMM—Changes are here so what's next?," In-Memory Computing Summit, 2016.
A. Badam and V. S. Pai, "SSDAlloc: hybrid SSD/RAM memory management made easy," NSDI, 2011.

\* cited by examiner

MEMORY CONTROLLING DEVICE AND COMPUTING DEVICE INCLUDING THE SAME

CROSS-REFERENCE TO RELATED APPLICATION

This application claims priority to and the benefit of Korean Patent Application Nos. 10-2017-0166935 filed on Dec. 6, 2017 and 10-2018-0126267 filed on Oct. 22, 2018, the entire contents of which are incorporated herein by reference.

BACKGROUND

(a) Field

The described technology generally relates to a memory controlling device and a computing device including the same.

(b) Description of the Related Art

Recently, persistent memory technologies have received significant attention as they can considerably improve the performance of datacenters and high-performance computers. Specifically, in many computing domains, back-end storage is required for recovery from system failures and crashes. As persistent memory can spontaneously and instantaneously recover all memory states, it can eliminate a large number of accesses to the back-end storage as well as associated runtime overheads.

There are various incarnations of persistent memory technologies, including NVDIMMs (Non-Volatile Dual In-line Memory Modules) such as NVDIMM-N and NVDIMM-P. The NVDIMM-N, for example, consists of a DRAM (Dynamic Random Access Memory) and a battery, but requires some software support such as direct access (DAX) from an OS (Operating System). The NVDIMM-N also integrates a small flash device which is not visible to users and is used only for backing up data from the DRAM when a power failure occurs. The NVDIMM-P is a hardware-only solution putting a battery-backed DRAM with a storage class memory such as 3D Xpoint™ or flash on the same module, and does not require any software support to benefit from the large capacity provided by the storage class memory. Since the NVDIMM offers byte-addressable persistency with DRAM-like latency and bandwidth], it can be useful to a wide range of data-intensive applications such as database management system (DBMS), transaction processing, and checkpointing. However, the DRAM capacity of the NVDIMM is limited due to poor scaling of battery technology. For example, for the past two decades, the storage density of DRAM has increased more than many orders of magnitude whereas the energy density of lithium-ion battery has only tripled.

One of the possible solutions to build a large and scalable, yet persistent memory space is to use the NVDIMM together with an SSD (Solid State Drive) and a memory-mapped file (MMF), which can be implemented in the memory manager or in the file system. This allows data-intensive applications to access a large storage space with conventional load/store instructions. However, such MMF-assisted persistent memory can degrade the performance of data-intensive applications at the user level, compared to the NVDIMM-only solution, by 48%, on average. This performance degradation is caused by not only long stalls experienced by load/store instructions but also by software overheads and numerous data copy operations between the user and system memory spaces.

SUMMARY

An embodiment of the present invention provides a memory controlling device and a computer device including the same, capable of aggregating a memory space of a memory and a storage space of a storage device into an expanded memory space.

According to an embodiment of the present invention, a memory controlling device of a computing device including a central processing unit (CPU), a memory, and a flash-based storage device is provided. The memory controlling device includes an address manager and an interface that is used to access the memory and the storage device. The address manager aggregates a memory space of the memory and a storage space of the storage device into an expanded memory space, and handles a memory request for the expanded memory space from the CPU by using the memory space of the memory as a cache for the storage space of the storage device.

An address of the memory request may be an address of a main memory which uses a capacity of the storage space as a capacity of a memory space of the main memory, and the address manager may handle the memory request by mapping the storage space of the storage device to the memory space of the memory.

The address manager may aggregate the memory space of the memory and the storage space of the storage device into the expanded memory space by using a cache logic that lookups a hit or a miss in the cache based on the address of the memory request.

The address manager may aggregate the memory space of the memory and the storage space of the storage device into the expanded memory space without assistance of software, by using a hardware cache logic as the cache logic.

The memory controlling device may further include a queue engine. In this case, the interface may include a memory interface for the memory and a storage device interface for the storage device. When the memory request is a miss in the cache, the address manager may generate a command having a command structure for the storage device based on the memory request and forward the command to the queue engine, and the queue engine may deliver the command to the storage device through the storage device interface. Further, when the memory request is a hit in the cache, the address manager may pull a memory address of the memory corresponding to the address of the memory request from the cache logic, and deliver the memory request having the memory address to the memory.

The queue engine may deliver the command to the storage device by submitting the command to a submission queue and ringing a doorbell register.

When the memory request is a read request, the command may include a first command that evicts cache data from the memory to the storage device and a second command that reads target data from the storage device to the memory. When the memory request is a write request, the command may include the first command that evicts the cache data from the memory to the storage device.

The first command may include a pointer indicating a memory address stored in a set corresponding to the address of the memory request among a plurality of sets in the cache logic, and an address indicating a storage device address which is generated based on the address of the memory request and a value stored in the set corresponding to the address of the memory request. The second command may include the pointer indicating the memory address stored in the set corresponding to the address of the memory request, and an address indicating a storage device address corresponding to the address of the memory request.

The memory controlling device may further include a storage device command generator that generates a command for the storage device to directly access the memory based on the memory request when the memory request is a miss in the cache. In this case, the interface may include a memory interface. The memory interface may be connected to a register of the memory and a register of the storage device by a register-based interface. The storage device command generator may deliver the command to the storage device through the memory interface so that the storage device directly accesses the memory through the register-based interface.

The command may include a source address, a destination address, and a request type. The source address may indicate one of a memory address of the memory and a storage device address of the storage device, the destination address may indicate another of the memory address and the storage device address, and the request type may indicate a read or a write. Data may be transferred from the source address to the destination address in accordance with a control of a controller of the storage device.

The memory controlling device may further include a lock register that is set when the command is delivered to the storage device. When the lock register is set, the memory controlling device may be blocked from accessing the memory.

When the memory request is a miss in the cache, a command may be delivered to the storage device so that the memory request is processed in the storage device and the memory. In this case, the command may include a journal tag. The journal tag may be set to a first value when the command is delivered to the storage device, and may be set to a second value when the command is completed in the storage device.

The memory may include a pinned memory region in which the cache logic is stored.

The cache logic may include a plurality of sets that correspond to a plurality indices, respectively, and each set may include a tag. In this case, an address of the memory request may be decomposed into at least a target tag and a target index. The address manager may determine a hit when the tag stored in a set having a same index as the target index among the plurality of sets is equal to the target tag, and may determine a miss when the stored tag is different from the target tag.

Each set may further include a busy bit indicating whether a corresponding cache region is in use. When cache data are evicted from the memory to the storage device in accordance with the miss of the memory request, the address manager may set the busy bit of a target set corresponding to the address of the memory request among the plurality of sets to a predetermined value, copy the cache data to a predetermined region of the memory, and update a pointer for evicting the cache data to point the predetermined region.

When a write request to a cache region corresponding to the target set is received from the CPU, the address manager may refer to the busy bit of the target set, allows the write request to wait when the busy bit is the predetermined value, and process the write request after eviction of the cache data is completed in the predetermined region.

According to another embodiment of the present invention, a computing device including the above-described memory controlling device, the CPU, the memory, and the storage device is provided.

According to yet another embodiment of the present invention, a memory controlling device of a computing device including a CPU, a memory, and a flash-based storage device is provided. The memory controlling device includes an address manager, a queue engine that manages a queue for the storage device, a memory interface for the memory, and a storage device interface for the storage device. The address manager aggregates a memory space of the memory and a storage space of the storage device into an expanded memory space, and handles a memory request for the expanded memory space from the CPU by using the memory space of the memory as a cache for the storage space of the storage device. The address manager uses a cache logic that lookups a hit or a miss in the cache based on an address of the memory request. When the memory request is the hit, the address manager delivers the memory request to the memory through the memory interface based on an entry of the cache logic corresponding to the address of the memory request. When the memory request is the miss, the address manager generates a command having a command structure for the storage device from the memory request based on an entry of the cache logic corresponding to the address of the memory request, and the queue engine delivers the command to the storage device through the storage device interface.

The address manager may aggregate the memory space of the memory and the storage space of the storage device into the expanded memory space without assistance of software, by using a hardware cache logic as the cache logic.

According to still another embodiment of the present invention, a memory controlling device of a computing device including a CPU, a memory, and a flash-based storage device is provided. The memory controlling device includes a memory including a first register and a memory area, a storage device including a second register and flash media, an address manager, a storage device command generator, and a memory interface. The address manager aggregates a memory space of the memory and a storage space of the storage device into an expanded memory space, and handles a memory request for the expanded memory space from the CPU by using the memory space of the memory as a cache for the storage space of the storage device. The memory interface is an interface for the memory and is connected to the first register and the second register by a register-based interface. The address manager uses a cache logic that lookups a hit or a miss in the cache based on an address of the memory request. When the memory request is the hit, the address manager delivers the memory request to the memory through the memory interface based on an entry of the cache logic corresponding to the address of the memory request. When the memory request is the miss, the address manager generates a command for the storage device to directly access the memory based on an entry of the cache logic corresponding to the address of the memory request, and delivers the command to storage device through the register-based interface so that the storage device directly accesses the memory through the register-based interface.

The address manager may aggregate the memory space of the memory and the storage space of the storage device into the expanded memory space without assistance of software, by using a hardware cache logic as the cache logic.

DETAILED DESCRIPTION OF THE EMBODIMENTS

Figure 1:
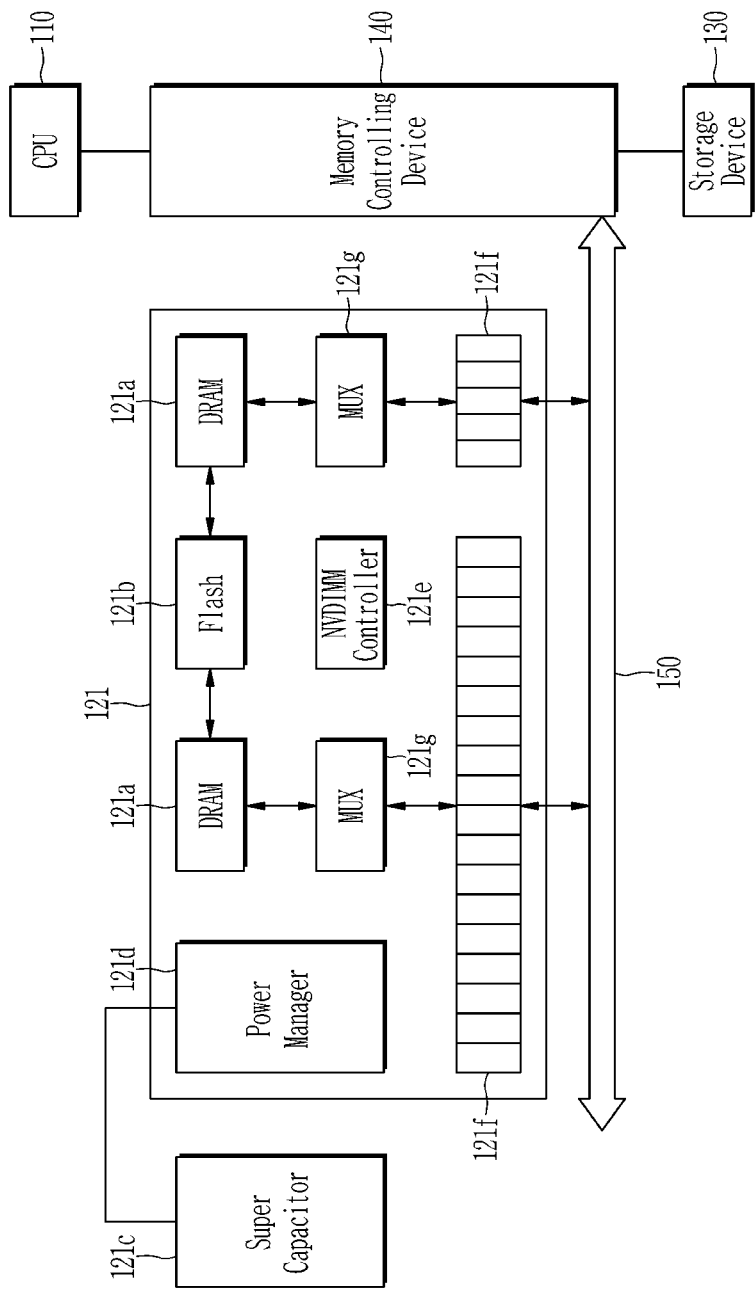
FIG. 1 and FIG. 2 each are a schematic block diagram of a computing device using a persistent memory.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
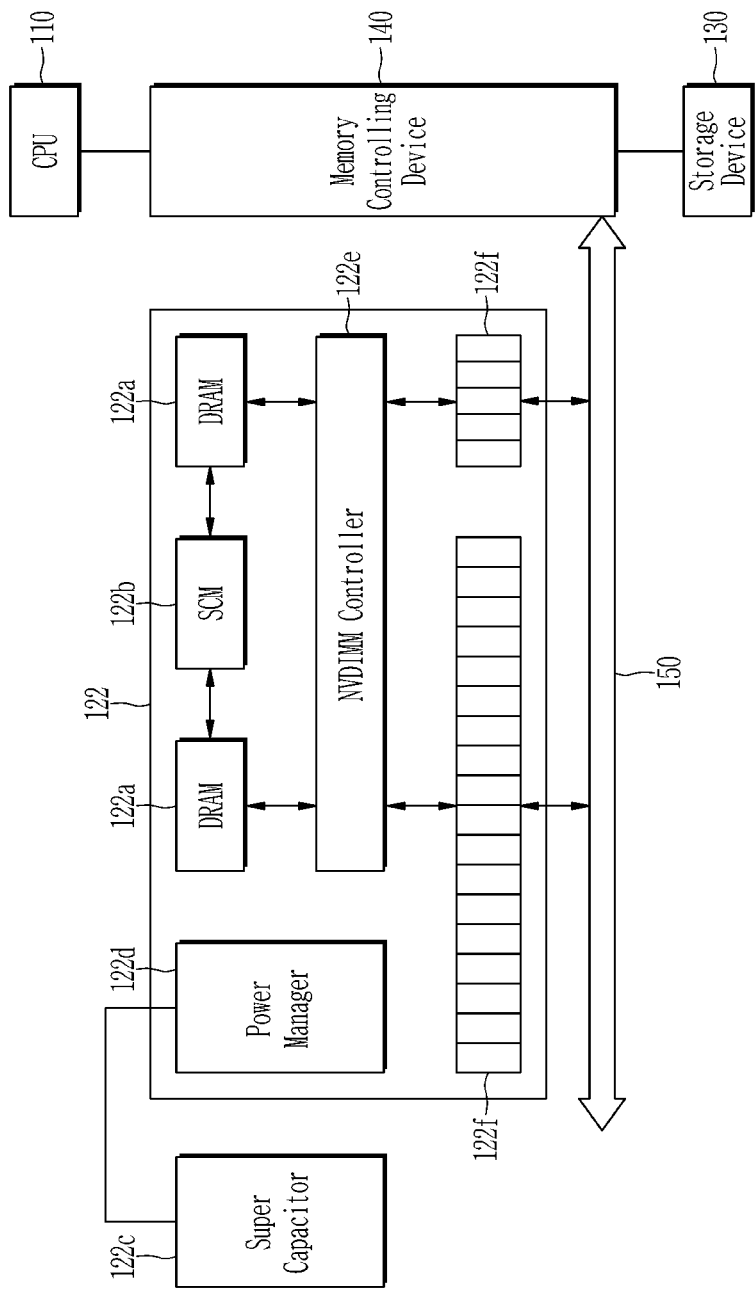

FIG. 1 and FIG. 2 each are a schematic block diagram of a computing device using a persistent memory.

Referring to FIG. 1 and FIG. 2, a computing device includes a CPU (Central Processing Unit) 110, a persistent memory 121 or 122, a storage device 130, and a memory controlling device 140.

The memory controlling device 140 connects the persistent memory 121 or 122 and the storage device 130 with the CPU 110, and may be, for example, a northbridge or a memory controller hub (MCH).

The persistent memory 121 or 122 may be, for example, an NVDIMM, and is connected to the memory controlling device 140 via a memory bus 150. The memory bus 150 may be, for example, DIMM (Dual In-line Memory Module) memory bus.

As shown in FIG. 1, the persistent memory 121 may be an NVDIMM-N. The NVDIMM-N 121 is a JEDEC (Joint Electron Device Engineering Council) standard for a persistent memory module, and includes a DRAM module 121a, a flash module 121b, a super capacitor 121c, a power manager 121d, an NVDIMM controller 121e, a DIMM connector 121f, and a multiplexer (MUX) 121g.

The NVDIMM-N 121 integrates the DRAM module 121a and the flash module 121b. The flash module 121b, as a backup storage medium of the DRAM module 121a, has the same capacity as the DRAM module 121a and is not visible to users. The super capacitor 121c is used as an energy source for backup operations of the DRAM module 121a when a power failure occurs, and the power manager 121d manages the power of the super capacitor 121c. The DIMM connector 121f connects the NVDIMM-N 121 to the memory bus. The multiplexer 121g is located between the DIMM connector 121f and the DRAM module 121a, and isolate the DRAM module 121a from the memory bus 150 when backup and restore operations take place. The NVDIMM controller 121e controls accesses to the DRAM module 121a and the backup and restore operations between the DRAM module 121a and the flash module 121b.

As shown in FIG. 2, the persistent memory may be an NVDIMM-P 122. The NVDIMM-P 122 includes a DRAM module 122a, a storage class memory (SCM) 122b, a super capacitor 122c, a power manager 122d, an NVDIMM controller 122e, and a DIMM connector 122f.

The NVDIMM-P 122 integrates the DRAM module 122a and the SCM module 122b, and exposes a storage space of the SCM module 122b to users, unlike the NVDIMM-N 121. The SCM module 122b may be, for example, 3D Xpoint™ with an on-board controller.

Since the DRAM module 121a or 122a serves memory requests to the NVDIMM 121 or 122 in a normal operating mode, the NVDIMM 121 or 122 can offer a DRAM-like latency and protocol management. When an unexpected power failure occurs, the DRAM module 121a or 122a taps the power from the supercapacitor 121c or 122c and maintains the state until the NVDIMM controller 121e or 122e complete the backup operation from the DRAM module 121a or 122a to the flash module 121b or SCM module 122b. After the power is restored, the NVDIMM controller 121e or 122e starts the restore operation from the flash module 121b or SCM module 122b to the DRAM module 121a or 122a.

The storage device 130 may be, for example, an SSD, in particular, a high-performance SSD such as an ultra-low latency flash (ULL-Flash). The SSD 130 is connected to another part of the memory controlling device 140, i.e., a PCIe (Peripheral Component Interconnect express) root complex 141. The PCIe interface is treated as a memory bus in modern computer systems, but transfers 4 KB or larger data packets between the CPU 110 and the SSD 130 for I/O (Input/Output) transactions. Since the granularity of I/O accesses is a page or block, user applications can only access the SSD 130 by going through the entire storage stack of the OS, which includes an I/O runtime library, a file system, and a block layer, atop an NVMe (Non-Volatile Memory express) driver. The NVMe driver manages transfers of data packets over PCIe, and communicates with an NVMe controller in the SSD 130 through the PCIe baseline address registers (BARs) including doorbell registers, queue attributes, target addresses for each queue, and NVMe controller information.

Figure 3:
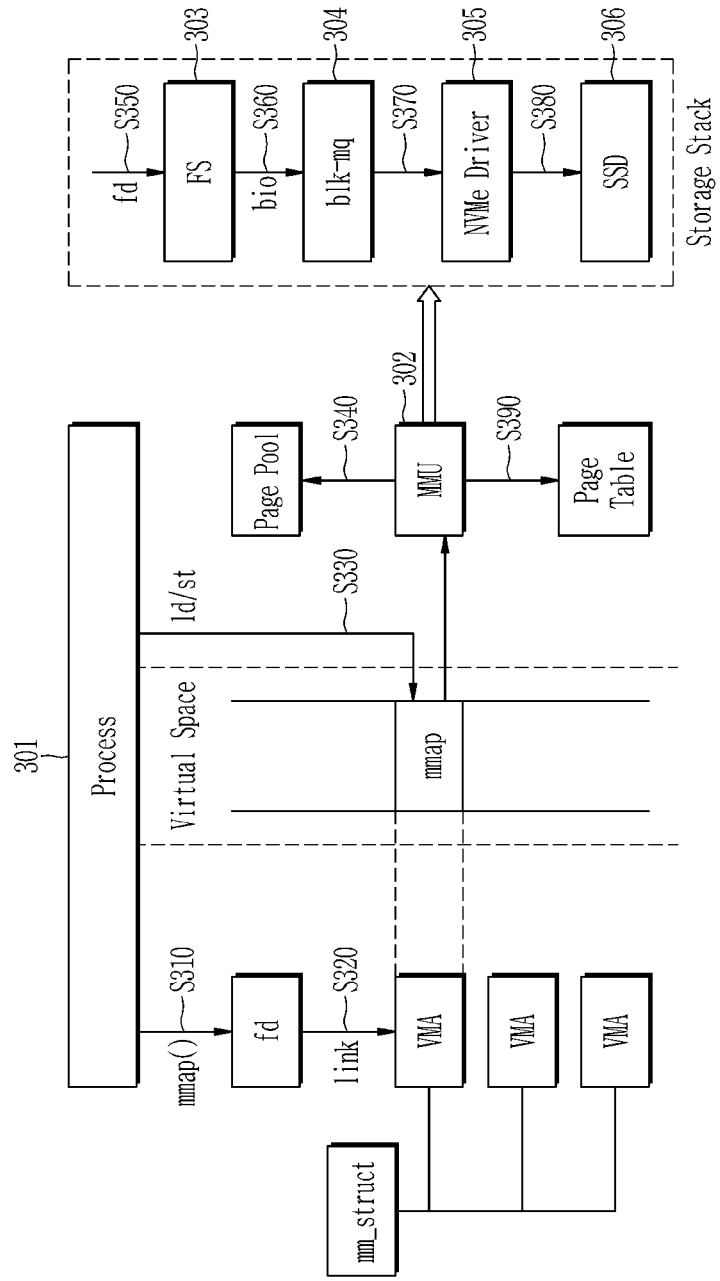
FIG. 3 is a drawing showing a software support and storage stack that a user application requires for expanding an NVDIMM with an SSD.

FIG. 3 is a drawing showing a software support and storage stack that a user application requires for expanding an NVDIMM with an SSD.

A memory-mapped file (MMF) module (called "mmap") in a Linux system can be used to expand a persistent memory space of an NVDIMM with an SSD 306. As shown in FIG. 3, if a process 301 calls mmap with a file descriptor (fd) for the SSD 306 in step S310, the MMF module creates a new mapping in its process address space (virtual space), represented by a memory management structure (e.g., mm_struct), by allocating a virtual memory area (VMA) to the structure. In other words, the MMF module links the fd to the VMA, by establishing a mapping between a process memory and a target file, in step S320. In step S330, when the process 301 accesses a memory designated by the VMA trough a load/store instruction (ld/st), this triggers a page fault if the data are not available in the NVDIMM.

When the page fault occurs, a memory management unit (MMU) handler 302 is invoked and allocates a new page to the VMA in step S340. The new page is allocated from a free page pool. Since the VMA is linked to the target file, the MMU handler 302 retrieves a file metadata (e.g., Mode) associated with the fd and acquires a lock for its access in step S350. The MMU handler 302 then communicates with a fault handler of the corresponding file system (FS) 303 to read a page from the SSD 306. In step S360, the file system 303 initializes a block I/O request structure, called bio, and submits it to a multi-queue block I/O queueing (blk-mq) layer 304, which schedules I/O requests over multiple software queues. Depending on a design of a target system, one or more software queues may be mapped to a hardware dispatch queue, managed by the NVM driver 305. The blk-mp layer 304 delivers the I/O request to the NVMe driver 305 in step S370, and the NVMe driver 305 issues a command according to the I/O request to the SSD 306 in step S380. Once the service of the I/O request (i.e., bio) is completed in SSD 306, and the actual data are loaded to a new region of the allocated page memory, the MMU handler 302 creates a page table entry (PTE), records a new page address in the PTE, and resumes the process, in step S390.

As such, the MMF module can be used to expand the persistent memory space of the NVDIMM with one or more SSDs. Such an approach, however, may negate a significant portion of the benefits brought by the high-performance SSD, because of high overheads caused by page fault, file system accesses, context switching, and data copies.

Next, an SSD is described with reference to FIG. 4 to FIG. 6.

Figure 4:
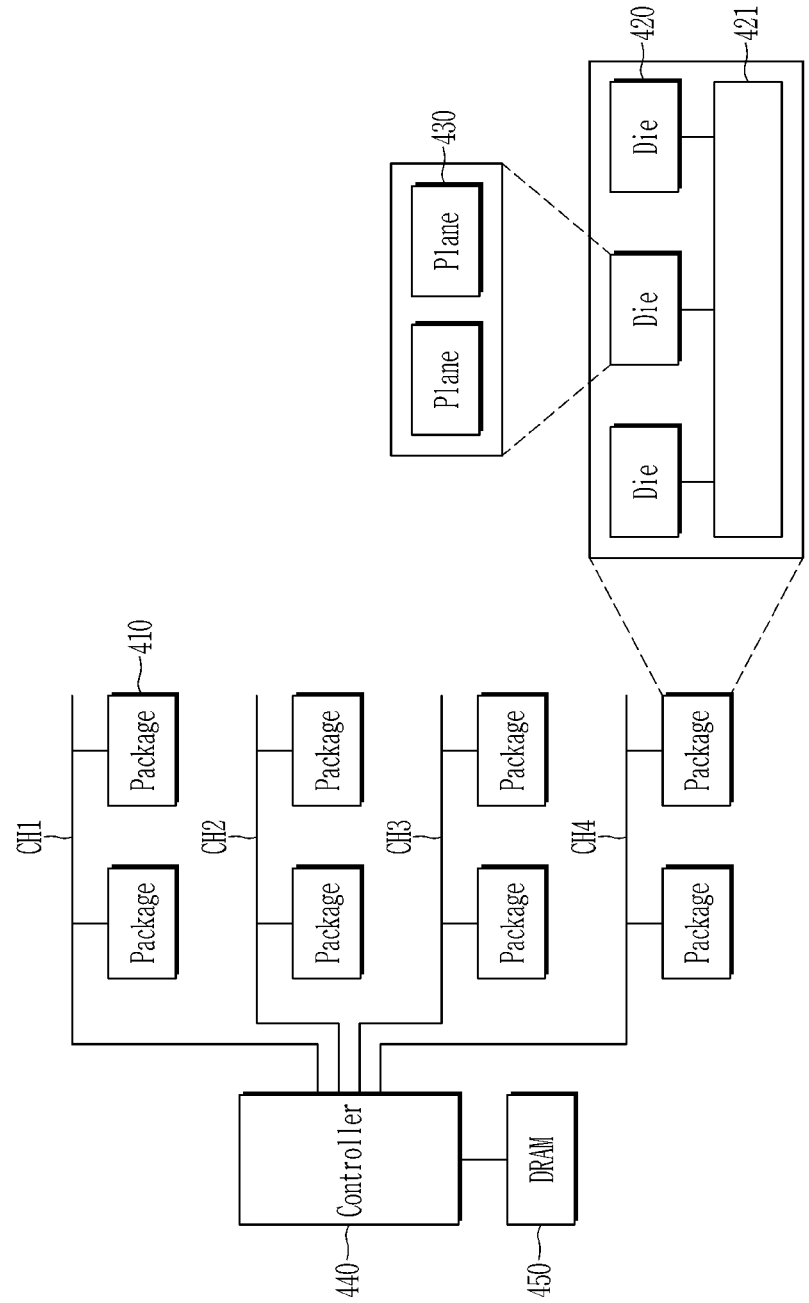
FIG. 4 is a schematic block diagram showing a structure of an SSD.
Figure 5:
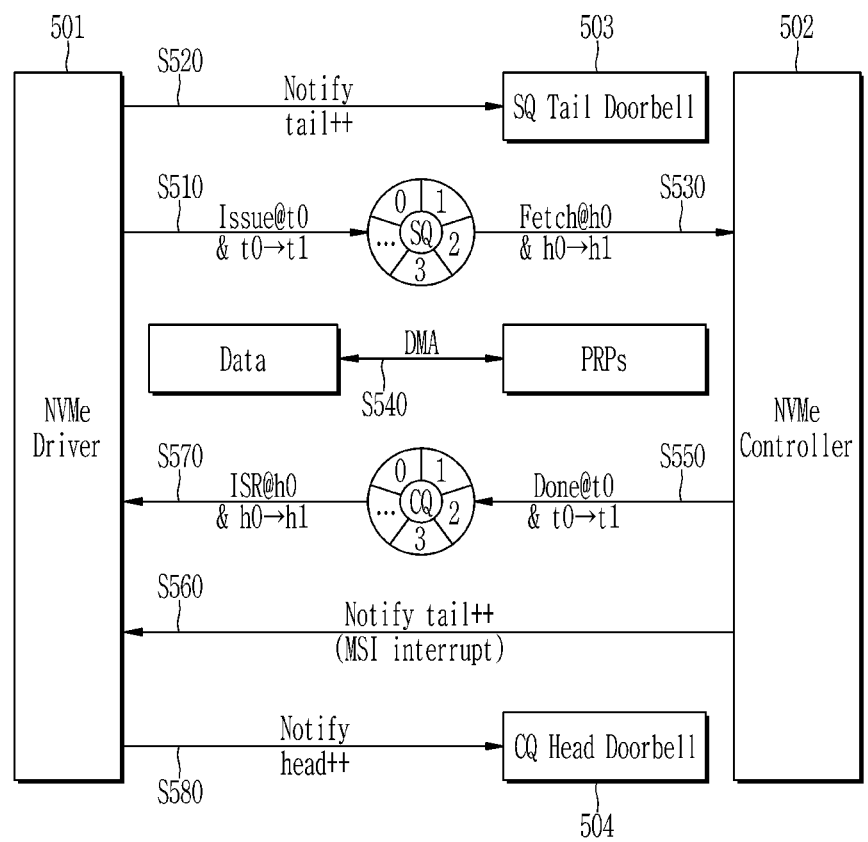
FIG. 5 is a drawing showing a data path of an SSD.
Figure 6:
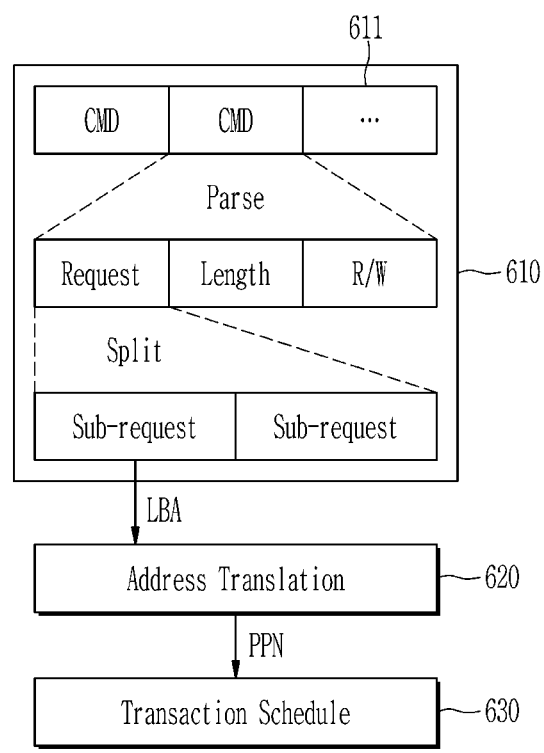
FIG. 6 is a drawing showing software architecture implemented in an SSD.

FIG. 4 is a schematic block diagram showing a structure of an SSD, FIG. 5 is a drawing showing a data path of an SSD, and FIG. 6 is a drawing showing software architecture implemented in an SSD.

Referring to FIG. 4, a state-of-the-art SSD, for example, a ULL-Flash typically employ a large number of flash packages 410 as flash media (flash complex) and connect to the flash packages 410 multiple system buses, referred to as channels CH1, CH2, CH3, and CH4. For convenience, four channels CH1 to CH4 and two flash packages 410 connected to each channel CHi are shown in FIG. 4

Each flash package 410 includes multiple dies 420 for fast response time and low latency, and the dies 420 are connected to a shared bus 421. Each die 420 may include multiple planes 430. For convenience, it is shown in FIG. 4 that one flash package 410 includes three dies 420, and each die 420 includes two planes 430. The channels CH1 to CH4 are connected to a controller 440 of the SSD, and the controller 440 may employ a DRAM 450 as a cache. To provide massive parallelism and high I/O performance, the controller 440 of the SSD spreads a given set of I/O requests from a host across the multiple channels CH1 to CH4, the packages 410, the dies 420, and the planes 430.

Further, the SSD adopts such a multi-channel and multi-way architecture but optimizes a data path and channel stripping. Specifically, the ULL-Flash splits a 4 KB I/O request from the host into two operations and issues them to two channels simultaneously; doing so can effectively reduce a direct memory access (DMA) latency by half. While most high-performance SSDs employ multiple-level cell (MLC) or triple-level cell (TLC), the ULL-Flash employs a new type of flash medium, called Z-NAND. The Z-NAND leverages a 3D-flash structure to provide a single-level cell (SLC) technology, but optimizes the I/O circuitry and memory interface to enable short latency. Specifically, the Z-NAND uses 48 stacked word-line layers, referred to as vertical NAND (V-NAND) architecture, to incarnate an SLC memory. Thanks to its unique NAND flash architecture and advanced fabrication technology, read and write latencies of the Z-NAND (i.e., 3 µs and 100 µs) are 15 times and 7 times lower, respectively, than the existing V-NAND flash memory.

Further, ULL-Flash implements a large DRAM module in front of its multiple channels and supports NVMe-based I/O services, which are managed by multiple interface controllers and firmware modules. The ULL-Flash exposes the massive parallelism, the low latency, and the high bandwidth through the NVMe interface. Management of the DRAM module is tightly coupled with NVM protocol handling, and the same data can be in both a host-side DRAM and an SSD-internal DRAM after the ULL-Flash controller or firmware performs the DMA for the data.

Referring to FIG. 5, an NVMe interface may create a queue per CPU. This queue consists of a pair of submission queue (SQ) and completion queue (CQ), each with 64K entries. These are simple FIFO (First In First Out) queues, and each entry is referenced by a physical region page (PRP) pointer. If a size of an I/O request is larger than a 4 KB NVMe packet, data may be referenced by a list of PRPs instead of a single PRP pointer.

It is assumed in FIG. 5 that head pointers and tail pointers of the SQ and CQ start from entry 0 (i.e., h0 and t0). When a request arrives at the SQ, a host (i.e., an NVMe driver 501 of the host) increases the SQ tail pointer to t1 in step S510, and rings a corresponding doorbell register 503 with the new tail pointer in step S520, so that an NVMe controller 502 within an SSD can synchronize an SSD-side SQ which is paired with the host-side SQ. In step S530, the NVMe controller of the SSD fetches an I/O request from an entry (entry 0) pointed by the SQ head pointer h0. Accordingly, the SQ head pointer h1 points a next entry (entry 1). Since data for each entry exist in a host-side DRAM pointed by a PRP, the SSD handles DMA for the I/O request, and then flash media and firmware serve the request in step S540.

Once the service is completed and a completion result is submitted to the CQ paired with the SQ, the NVMe controller 502 moves the CQ tail pointer from t0 to t1 in step S550, and informs the host of an event over a message signaled interrupt (MSI) in step S560. The host then jumps to an interrupt service routine (ISR) and synchronizes the CQ tail pointer in step S570. The ISR completes the request and update (i.e., increases) the CQ head pointer in step S570, and rings a corresponding doorbell register 504 with the new head pointer to notify that the host-side I/O processing has completed in step S580. Finally, the NVMe controller 502 of the SSD releases the internal data and increases the CQ head pointer. The NVMe interface has no knowledge of the data cached in the host-side DRAM, while the data for each I/O request can reside in the host-side DRAM. Therefore, even if I/O requests can be serviced by the host-side DRAM, the NVMe interface enqueues the requests and processes them.

Referring to FIG. 6, at the top of firmware layers within an SSD, a host interface layer (HIL) 610 is responsible for parsing NVMe commands (CMD) of NVMe queues 611 and managing the NVMe queues 611 by collaborating with an internal NVMe controller.

The parsed NVMe command (CMD) may include an I/O request, a length, and a request type (R/W) for indicating read/write. The HIL 610 may split an I/O request, which can be of any length, into sub-requests. A size of a sub-request may match with a unit I/O size which a firmware module manages. The parsed (and separate) requests are forwarded to a flash translation layer (FTL) 620. The FTL 620 translates a given logical address, for example, a logical block address (LBA) to a physical address, for example, a physical page number (PPN). After an address of each sub-request is translated into a PPN, a flash interface layer (FIL) 630 submits the request and manages transactions, which constitutes multiple flash commands such as row/column addresses, I/O commands, administrative commands, and DMA transfers. During this I/O processing, either the FTL 620 or the FIL 630, depending on its implementation and design strategy, may stripe the requests across multiple internal resources (e.g., channels, packages, dies, planes, etc.), thereby achieving the low latency and high bandwidth.

Next, a memory controlling device of a computing device according to an embodiment of the present invention is described with reference to FIG. 7 to FIG. 15.

Figure 7:
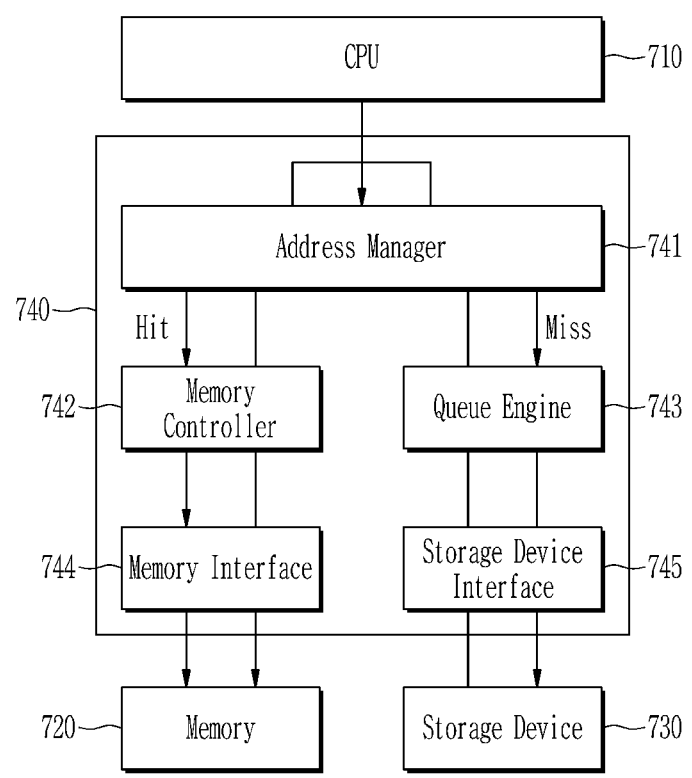
FIG. 7 is a schematic block diagram showing a computing device according to an embodiment of the present invention.
Figure 8:
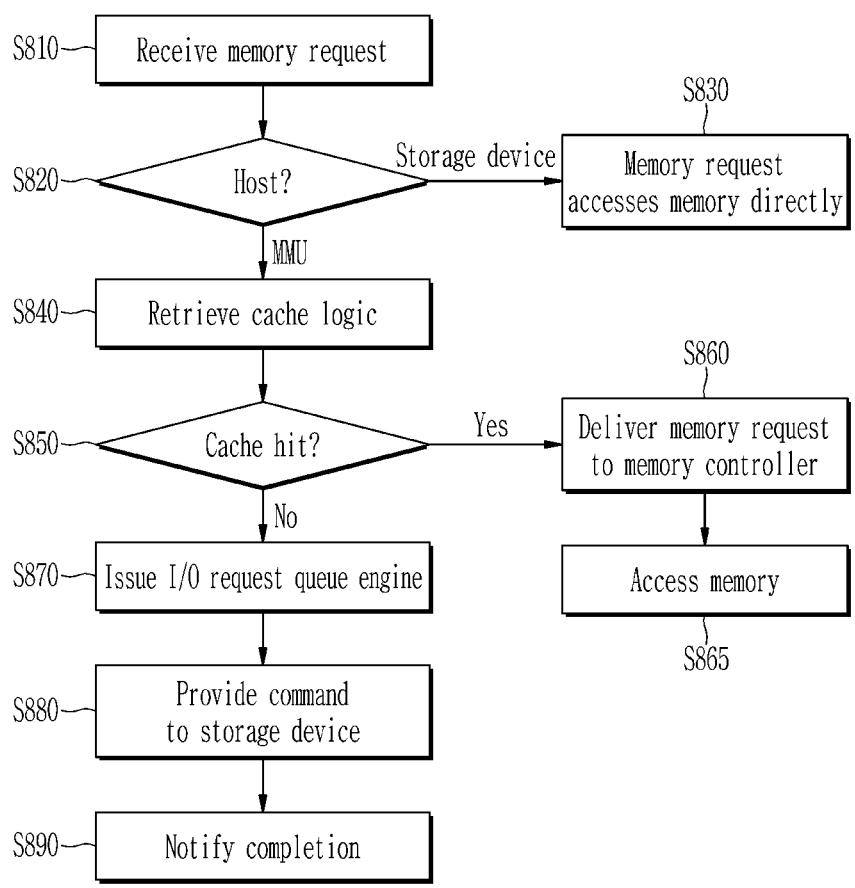
FIG. 8 is a flowchart showing an operation of a memory controlling device according to an embodiment of the present invention.

FIG. 7 is a schematic block diagram showing a computing device according to an embodiment of the present invention, and FIG. 8 is a flowchart showing an operation of a memory controlling device according to an embodiment of the present invention. FIG. 7 shows an example of a possible computing device, and a computing device according to an embodiment of the present invention may be implemented by various structures.

Referring to FIG. 7, a computing device according to an embodiment of the present invention includes a CPU 710, a memory 720, a storage device 730, and a memory controlling device 740.

The memory 720 may be a main memory which is accessed and used by the CPU 710. In one embodiment, the memory 720 may be a volatile memory such as a DRAM. In another embodiment, the memory 720 may be a persistent memory, and the persistent memory may be, for example, an NVDIMM.

The storage device 730 is a flash-based storage device such as an SSD, and may be, for example, a ULL-Flash.

The memory controlling device 740 connects the memory 720 and the storage device 730 with the CPU 710, and may be, for example, a northbridge or a memory controller hub (MCH). The memory controlling device 740 provides a memory-over-storage (MoS) that aggregates a memory capacity of the memory 720 and a storage capacity of the storage device 730 into an expanded memory space (e.g., a single memory space), and this expanded memory space may be used as a working memory expansion. In some embodiments, the memory controlling device 740 may automate necessary hardware, in order to expand the memory space by aggregating the memory capacity of the memory 720 and the storage capacity of the storage device 730. In some embodiment, when the memory 720 is the persistent memory, the expanded memory space may be used as a persistent memory expansion.

The memory controlling device 740 handles all memory requests from a host, for example, a memory management unit (MMU) of the CPU 710, by mapping the storage space of the storage device 730 to the memory space of the memory 720. Accordingly, in some embodiments, an address of the memory request may indicate an address of the storage device 730. In some embodiments, the MMU may be a hardware unit that manages memory accessed by the CPU 710, and may be implemented on the same chip as the CPU 710 but also may be implemented in the form of a chip separate to the CPU 710. The memory controlling device 740 uses the memory space of the memory 720 as a cache of the storage device 730. Accordingly, the MMU of the CPU 710 or the storage device 730 can access the memory 720 to transfer target data. In a case of a cache miss, the memory controlling device 740 internally manages NVMe commands and I/O request queues while hiding all NVMe-related protocol and interface management information from the OS, so that data requested by the MMU can be always served by the memory 720.

Referring to FIG. 7 again, the memory controlling device 740 includes an address manager 741, a memory controller 742, and a queue engine 743. The memory controller 742 is connected to the memory 720 through a memory interface 744, and manages a flow of data transferred to or from the memory 720. The queue engine 743 is connected to the storage device 730 through a storage device interface 745. In one embodiment, the memory interface 744 may be a DDR (Double Data Rate) interface, and the storage device interface 745 may be a PCIe root complex and PCIe interface.

The address manager 741 offers a byte-addressable address space by exposing the storage capacity of the storage device 730 to the CPU 710, in particular, the MMU of the CPU 710. Since the memory 720 is used as the cache, the address manager 741 may employ a cache logic, for example, a hardware cache logic, to decide where incoming memory requests are forwarded to. Further, the address manager 741 manages PRPs for indicating a region to which data are stored in the memory 720. In some embodiments, the address manager 741 may implement hardware automation by employing the hardware cache logic that decides where the incoming memory requests are forwarded to.

Referring to FIG. 7 and FIG. 8, when the memory controlling device 740 receives a memory request from the host in step S810, the address manager 741 checks who a host of the memory request is in step S820. Since either the MMU of the CPU 710 or the storage device 730 can access the memory 720 to transfer target data, the address manager 741 checks who the host of the memory request is in step S820.

If the memory request is generated by the storage device 730 in step S820, the address manager 741 allows the memory request to directly access the memory 720 in step S830. In other words, a controller of the storage device 730, for example, an NVMe controller may perform data transfers by referring to PRPs which the address manager 741 manages.

If the memory request is generated by the MMU in step S820, the address manager 741 retrieves the cache logic with an address of the memory in step S840. When the lookup result of the cache logic is a cache hit in step S850, the memory request is delivered to the memory controller 742 in step S860. In some embodiments, the address of the memory request may be an address on an address space (i.e., a MoS address space) of the memory space into which the memory capacity of the memory 720 and the storage capacity of the storage device 730 are aggregated. The CPU 710, i.e., the MMU may generate the memory request by seeing the storage capacity of the storage device 730 as a memory space of a main memory. In other words, the address of the memory request may be an address of the main memory that has the storage capacity of the storage device 730 as the memory space of the main memory. The address of the memory request may be a byte-addressable address. For example, since the existing computing device uses the memory 720 having a space of 2-64 GB whereas the storage device 730 such as an SSD supports a terabyte-scale capacity, the computing device may operate like using the main memory having the terabyte-scale capacity.

In a case of the cache hit, a memory address corresponding to the address of the memory request may be acquired and be forwarded to the memory controller 742. The memory address is an address for accessing the memory 720. The memory controller 742 then accesses the memory 720 through the memory interface 744 and transfers data in step S865.

When the lookup result of the cache logic is a cache miss in step S850, the address manager 741 generates a new I/O request (i.e., a command) for a data transfer between the memory 720 and the storage device 730 from the memory request and issues the I/O request to the queue engine 743 in step S870. Accordingly, the queue engine 743 provides the command to the storage device 730 through the PCIe root complex and interface so that the data are transferred from the storage device 730 to the memory 720 or from the memory 720 to the storage device 730 in step S880. Once the data transfer is completed, in step S890, the memory controlling device 740 informs the MMU of the completion through a memory system bus (e.g., an AXI (Advanced Extensible Interface)) so that the MMU can retry the stalled instruction. In other words, the MMU may read the target data from the memory 720, i.e., a corresponding cache region in a case of a read request, and may write the target data to the memory 720, i.e., a corresponding cache region in a case of a write request.

In some embodiments, the address manager 741 may compose the I/O request to be issued to the queue engine 743 by filling information fields of a command structure for the storage device 730, for example, an NVMe command structure. In one embodiment, the address manager 741 may fill information indicating a read or a write into a field indicating a read or a write (e.g., an opcode field), and fill the memory address, a storage device address, and a page size (e.g., 4 KB) into corresponding PRP, LBA, and length fields, respectively.

The generated command (e.g., the NVMe command) may be enqueued in an SQ by the queue engine 743. The queue engine 743 may ring a doorbell register to inform the storage device 730 of arrival of the I/O request. Whenever a corresponding interrupt is delivered from a controller of the storage device 730, the queue engine 743 may synchronize a corresponding CQ and clear target entries of the CQ and SQ.

Figure 9:
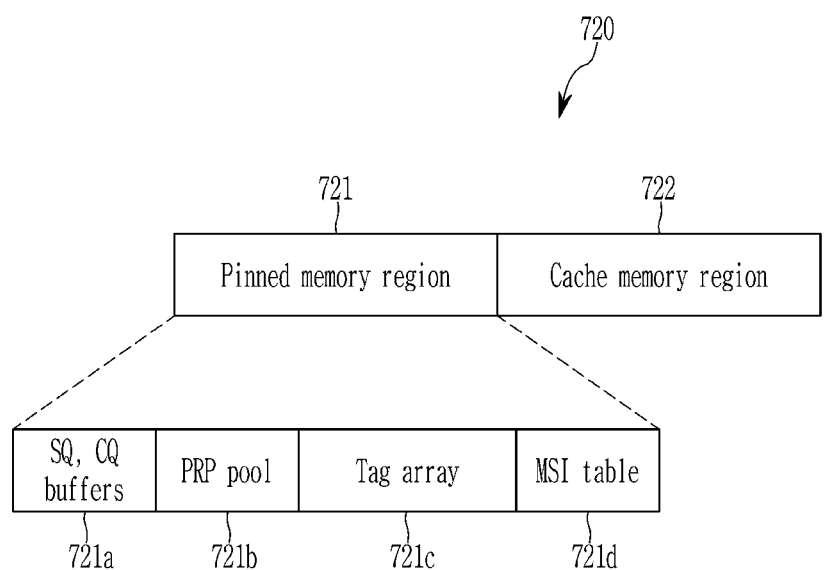
FIG. 9 is a drawing showing a memory of a computing device according to an embodiment of the present invention.

FIG. 9 is a drawing showing a memory of a computing device according to an embodiment of the present invention.

Referring to FIG. 9, in some embodiments, a specific memory region of a memory 720 may be pinned, and the pinned memory region 721 may be used for an operation of a memory controlling device (740 of FIG. 7). The memory 720 may further include a cache memory region 722 used for a cache in addition to the pinned memory region 721. In one embodiment, the pinned memory region 721 may be allocated to an upper memory region (e.g., 512 MB) of the memory 720. The cache memory region 722 may be allocated to the remaining region of the memory 720, and may be mapped to an MoS address space by an address manager (741 of FIG. 7) of the memory controlling device 740.

In some embodiments, the pinned memory region 721 may include buffers 721a for an SQ and CQ, for example, ring buffers.

One of issues which can occur when designing the memory controlling device 740 may be power failure management. Although a storage device such as an SSD is treated as a block storage device that guarantees data persistency and consistency, it is accessed through a file system. Specifically, the file system and other related components support consistency using journaling. Since the memory controlling device 740 may remove the MMF and file system support, data in an SSD-internal DRAM may be lost upon the power failure. While the memory controlling device 740 may enforce data persistency by tagging force unit access (FUA) per request, doing so may degrade SSD performance significantly by disabling all the queue features of the NVMe interface.

To address this challenge, some embodiments may make the pinned memory region 721 invisible to the MMU of the CPU. During an initialization process, the memory controlling device 740 reviews the SQ and CQ of the pinned memory region 721 and their pointers. If there is no power failure, the SQ and CQ tail pointers refer to the same location of their queue entries to avoid a violation of queue management and consistency at any given runtime. If the power failure occurs, the SQ and CQ tail pointers may refer to the different locations (i.e., different offsets) of their queue entries. Therefore, when the power is restored after the power failure, the memory controlling device 740 checks the offset differences between the SQ and CQ tail pointers in the MMU-invisible space, i.e., the pinned memory region 721. The memory controlling device 740 may detect the pending requests based on the offset differences and issue them to the storage device 730 again.

In some embodiments, the pinned memory region 721 may include a tag array 721c to be used for a cache logic.

In some embodiments, the pinned memory region 721 may include a PRP pool 721b. A target page of the cache memory region 722 may be copied to the PRP pool 721b, and an entry of the copied page may be referred by the PRP.

In some embodiments, the pinned memory region 721 may include an MSI (Message Signaled Interrupt) table 721d. The MSI table 721d may include information of interrupt resources, and the interrupt resources may be, for example, an interrupt vector, address, and mask. When the storage device 730 is initialized, a controller of the storage device 730 may read the MSI table 721d and fill the read information into its MSI configuration.

Figure 10:
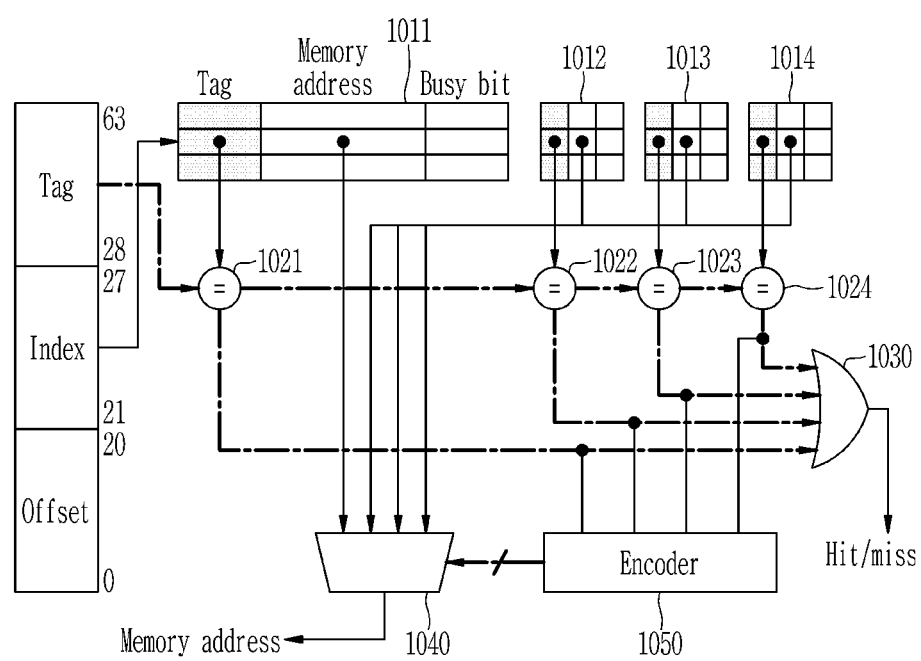
FIG. 10 is a drawing showing a cache logic of a memory controlling device according to an embodiment of the present invention.

FIG. 10 is a drawing showing a cache logic of a memory controlling device according to an embodiment of the present invention.

Referring to FIG. 10, in some embodiments, an address manager (741 of FIG. 7) of a memory controlling device may use a cache logic including a tag array 1000. The tag array 1000 includes a plurality of ways 1011, 1012, 1013, and 1014, and each way includes a plurality of sets each corresponding to an array index. It is assumed in an example of FIG. 10 that the tag array 1000 includes four ways 1011 to 1014 and each way includes 128 sets. In some embodiments, the tag array 1000 may be formed in a pinned memory region (721 of FIG. 9) of a memory (720 of FIG. 9). Each set may indicate a predetermined size of block in the memory 720, in particular, a cache memory region 722 of the memory 720, and may include a tag and a memory address. An address of a memory request received from an MMU may be decomposed into a tag, an array index, and an offset. For example, when each way includes 128 sets, the array index may have 7 bits. In this case, a 64-bit address may be decomposed into, for example, a 36-bit tag, a 7-bit array index, and a 21-bit offset.

The address manager 741 of the memory controlling device uses an array index decomposed from the address of the incoming memory request to retrieve an entry of a set corresponding to the array index from the ways 1011 to 1014 of the tag array 1000. The address manager 741 compares a tag pulled from the corresponding set of the ways 1011 to 1014 with a tag decomposed from the address of the incoming request.

As the comparison result, if the tag pulled from any one way and the tag of the incoming request match, the address manager 741 determines a cache hit and brings a memory address from the set storing the matched tag. In a case of the cache hit, the address manager 741 issues the memory address brought from the tag array 1000 to a memory controller (742 of FIG. 7) so that the incoming request can be processed in the memory, i.e., a cache memory region (722 of FIG. 9) of the memory.

If the tag of the incoming request does not match the tags pulled from all the ways, the address manager 741 determines a cache miss. In a case of the cache miss, the address manager 741 generates a new I/O request.

In one embodiment, when the memory request is a read request, the address manager 741 may generate two I/O requests. The two I/O requests may include a write request that evicts data from the memory, i.e., the cache memory region 722 of the memory and writes the data to a storage device (730 of FIG. 7) and a read request that reads data from the storage device 730 and fills the data to the memory, i.e., the cache memory region 722 of the memory. In some embodiments, a PRP (a memory address) of the write request may correspond to a memory address stored in the set corresponding to the array index (i.e., a memory address of a corresponding cache region), and an LBA (a storage device address) of the write request may correspond to a storage device address which is generated based on the array index of the memory request and a tag stored in the set corresponding to the array index. Further, a PRP (a memory address) of the read request may correspond to the memory address stored in the set corresponding to the array index (i.e., the memory address of the corresponding cache region), and an LBA (a storage device address) of the read request may correspond to the address of the memory request. In this case, the LBA may be translated into a physical address (e.g., a PPA) by an FTL of the storage device 730. The storage device 730 writes the data evicted from the cache memory region 722 to flash media of the storage device 730 in accordance with the write request, and reads the data stored in the flash media of the storage device 730 in accordance with the read request so that the data are written to the corresponding region of the cache memory region 722. For example, the storage device 730 may write the data of the cache memory region 722 referred by the PRP included in the write request to the flash media of the storage device 730 corresponding to the storage device address (LBA) included in the write request, and may read target data from the flash media of the storage device 730 corresponding to the storage device address (LBA) included in the read request, thereby writing the target data to the cache memory region 722 referred by the PRP included in the read request. Accordingly, once the target data are available in the cache memory region 722, the memory controlling device 740 may place the target data on a system bus and notify the completion of the CPU by setting corresponding command and address buses of the MMU.

In one embodiment, when the memory request is a write request, the address manager 741 may generate a write request as the I/O request. The write request may be a request that evicts data from the memory, i.e., the cache memory region 722 of the memory and writes the data to a storage device 730. In some embodiments, a PRP (a memory address) of the write request may correspond to a memory address stored in the set corresponding to the array index, and an LBA (a storage device address) of the write request may correspond to a storage device address which is generated based on the array index of the memory request and a tag stored in the set corresponding to the array index. The storage device 730 writes the data evicted from the cache memory region 722 to flash media of the storage device 730 in accordance with the write request. For example, the storage device 730 may write the data of the cache memory region 722 referred by the PRP included in the write request to the flash media of the storage device 730 corresponding to the storage device address (LBA) included in the write request. Accordingly, the address manager 741 may issue the memory address pulled from the tag array 1000 to the memory controller 742 so that target data of the memory request can be written to the evited region of the cache memory region 722.

In some embodiments, as shown in FIG. 10, a cache logic may further include comparators 1021, 1022, 1023, and 1024, an OR gate 1030, a multiplexer 1040, and an encoder 1050. In one embodiment, the comparators 1021 to 1024, the OR gate 1030, the multiplexer 1040, and the encoder 1050 may be implemented in the address manager 741. The comparators 1021 to 1024 correspond to the ways 1011 to 1014, respectively. Each of the comparators 1021 to 1024 compares the tag pulled from a corresponding one of the ways 1011 to 1014 with the tag of the incoming memory request, and outputs either '1' or '0' in accordance with the comparison result. For example, each of the comparators 1021 to 1024 may output '1' (i.e., the cache hit) if the two tags are the same, and may output '0' (i.e., the cache miss) if the two tags are different. The OR gate 1030 finally outputs the cache hit or miss based on the outputs of the comparators 1021 to 1024. The OR gate 1030 may output '1' (i.e., the cache hit) if any one of the comparators 1021 to 1024 outputs '1', and may output '0' (i.e., the cache miss) if all the comparators 1021 to 1024 output '0'. The encoder 1050 may encode the values outputted from the comparators 1021 to 1024 to transfer a value indicating the way corresponding to the cache hit among the ways 1011 to 1014 to the multiplexer 1040. The multiplexer 1040 may output a memory address brought from the way corresponding to the cache hit among the ways 1011 to 1014, that is, the way corresponding to the comparator outputting '1'.

In some embodiments, each set may include as the entry a busy bit indicating whether a corresponding cache region is in use. An NVMe data structure including an SQ and a CQ may be mapped to a region of the memory 720, which can be overwritten by applications or the OS. This can potentially create a correctness issue for the memory controlling device 740. In addition, data in the memory 720 may be inconsistent in a case where the memory controlling device 740 evicts the data, even if the data are being written to or loaded from the storage device 730 through the PRP. To protect the memory 720 to which the data are being transferred, the memory controlling device 740 may keep track of the data transfer status through the busy bit of each entry. In one embodiment, the busy bit may be set whenever the queue engine 743 issues a command, and may be cleared when the I/O service according to the command is completed (e.g., when the MSI reports the completion and updates the CQ head pointer). Thus, if the busy bit is set, the memory controlling device 740 may exclude corresponding data from being evicted.

As described above, according to an embodiment of the present invention, the memory capacity of the memory and the storage capacity of the storage device can be aggregated into expanded memory space, and the expanded memory space can be used as the working memory expansion or the persistent memory expansion. In this case, the CPU can access the expanded memory space with a byte-addressable address, using the storage capacity as the memory capacity of the main memory. In some embodiments, the expanded memory space can be aggregated without modification of the existing storage device, memory and interface. In some embodiments, the expanded memory space can be aggregated without assistance of software, through hardware automation using the hardware cache logic and the like.

Figure 11:
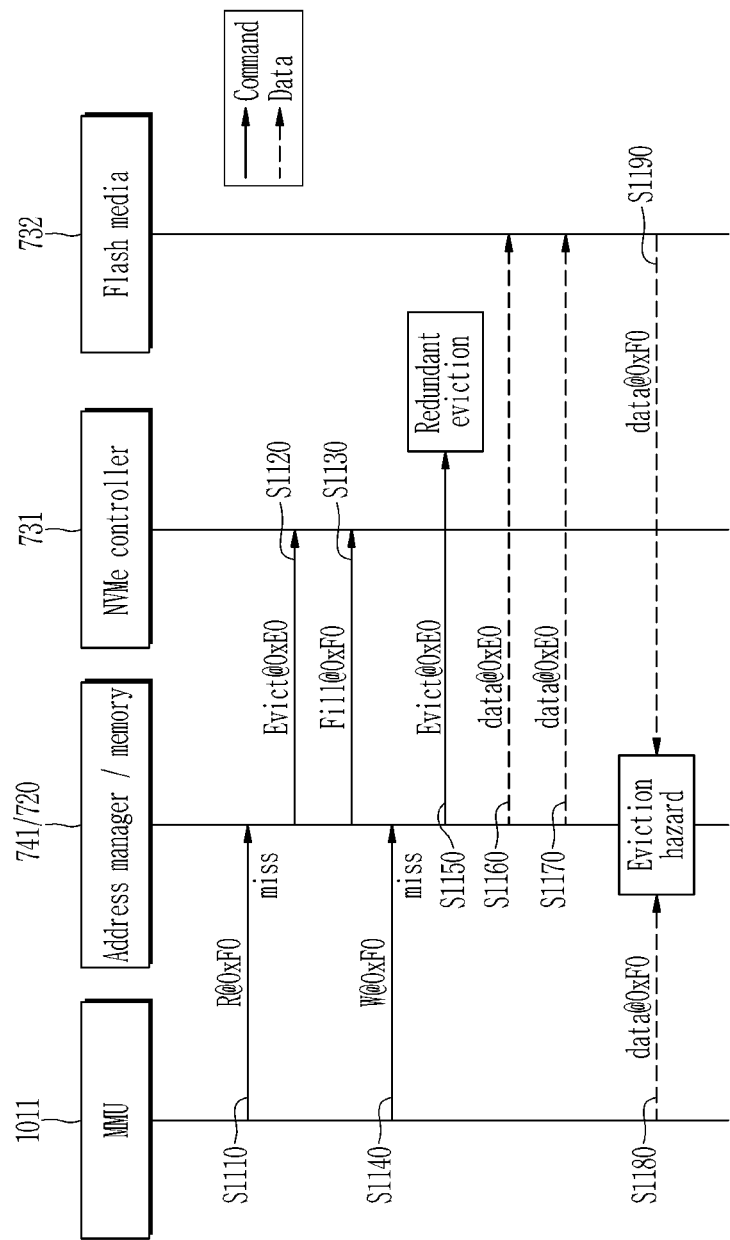
FIG. 11 is a drawing showing an example of a data transfer between a memory and a storage device in a computing device according to an embodiment of the present invention.
Figure 12:
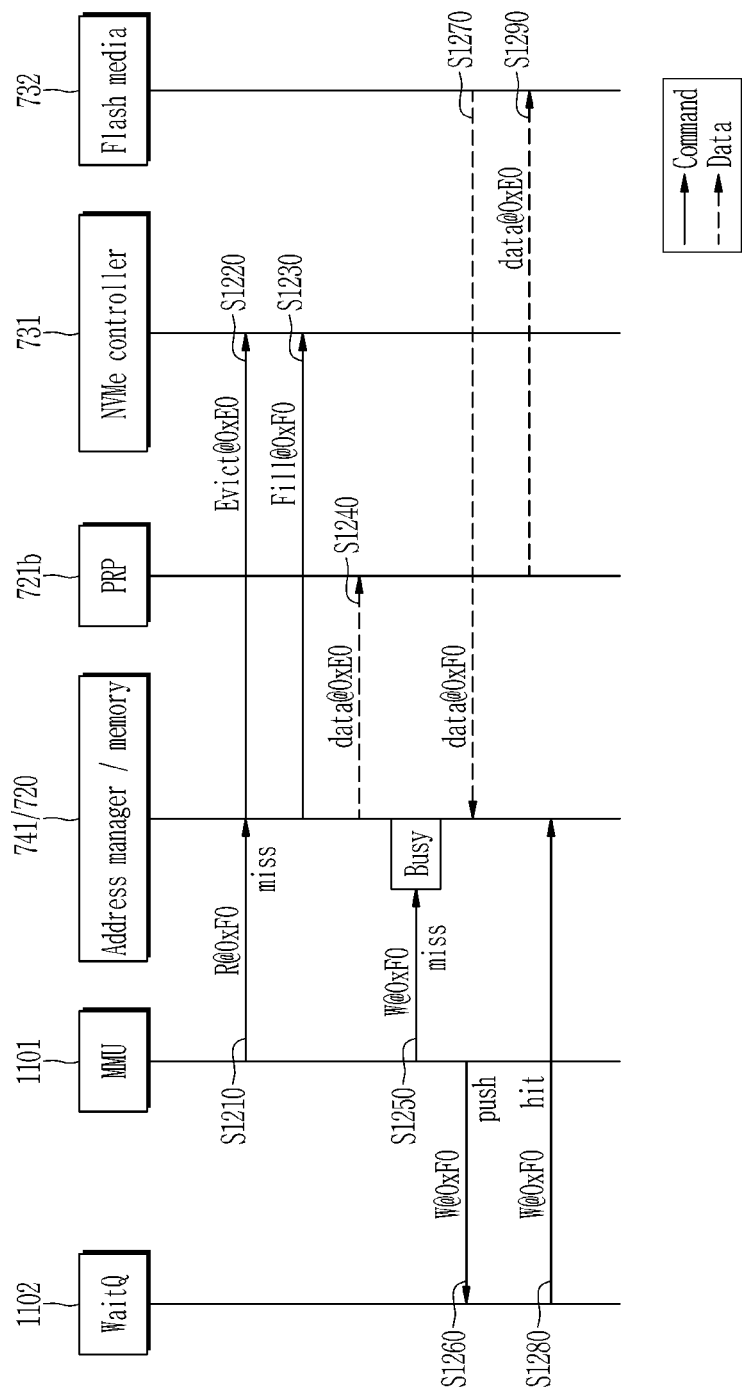
FIG. 12 is a drawing showing another example of a data transfer between a memory and a storage device in a computing device according to an embodiment of the present invention.

FIG. 11 is a drawing showing an example of a data transfer between a memory and a storage device in a computing device according to an embodiment of the present invention, and FIG. 12 is a drawing showing another example of a data transfer between a memory and a storage device in a computing device according to an embodiment of the present invention.

Referring to FIG. 11, in step S1110, an MMU 1101 may request a read at 0xF0 of the MoS address space, an array index and tag of which are 0x0 and 0xF, respectively. It is assumed that a set corresponding to an array index of 0x0 stores 0xE as a tag and 0xA as a memory address, in a tag array (1000 of FIG. 10) of a cache logic. Then, since a cache miss occurs, an address manager 741 generates a write request and a read request to be transferred to a controller (e.g., an NVMe controller) 731 of a storage device (730 of FIG. 7), in steps S1120 and S1130. Since 0xE is stored as the tag of the set corresponding to the array index of 0x0 in the tag array 1000, the write request may be a request that evicts data stored in the cache (e.g., a page at 0xE0 of the MoS address space, the array index and tag of which are 0x0 and 0xE, respectively, i.e., a page at 0xA of the memory) to flash media 732 of the storage device 730, and the read request may be a request that fills a page of the flash media corresponding to 0xF0 into the cache corresponding to the array index of 0x0.

After the read request, the MMU 1011 may request a write at 0xF0 of the MoS address space to update data at 0xF0 in step S1140. In this case, since the data have not been evicted from the cache or are being in eviction, a cache miss may occur. According to the cache miss, the address manager 741 may generate a write request that evicts the data stored in the cache to the storage device 730 in step S1150. The write request may be a request that evicts the data stored in the cache (e.g., a page at 0xE0 of the MoS address space, i.e., a page at 0xA of the memory) to the flash media 732 of the storage device 730. Then, the address manager 741 evicts the same data from the cache. In other words, an issue of redundant eviction may occur.

The queue engine 743 may include three commands (e.g., three NVMe commands) corresponding the write request in step S1120, the read request in step S1130, and the write request in step S1150. The three commands may be processed by the controller 731 of the storage device in a FIFO order. However, I/O completions within the storage device 730 may be out-of-order, due to different levels of flash parallelism and tasks within the storage device. Further, since the controller 731 of the storage device 730 transfers the data to the memory 720 based on the order of completion, the controller 731 of the storage device 730 and the address manage 741 may access the same location of the memory 720, thereby causing an eviction hazard. In the above-described example, the data stored in the cache (i.e., the data at 0xE0 of the MoS address space) may be evicted and written to the flash media 732 of storage device 730 in accordance with the write request (S1120) in step S1160, and the data stored in the cache (i.e., the data at 0xE0 of the MoS address space) may be evicted and written to the flash media 732 of storage device 730 in accordance with the write request (S1150) in step S1170. Since the data are evicted from the cache, in step S1180, the address manager 741 may access the memory 720 to write data from the MMU 1101 to 0xF0 of the MoS address space in accordance with the write request (S1140) from the MMU 1101. At this time, in step S1190, the controller 732 of the storage device may access the memory 720 to write data from the storage device 730 to 0xF0 of the MoS address space in accordance with the read request (S1130). As such, the controller 731 of the storage device and the address manager 741 may access the same location of the memory 720, thereby causing the eviction hazard.

In some embodiments, to prevent the redundant eviction and the eviction hazard, a pinned memory region (721 of FIG. 9) may include a PRP pool 721c as described with reference to FIG. 9, and each set of a tag array may include a busy bit as described with reference to FIG. 10.

Referring to FIG. 12, as described with reference to FIG. 11, upon receiving a request for a read at 0xF0 from the MMU 1101 in step S1210, in steps S1220 and S1230, the address manager 741 may generate a write request for cache eviction and a read request for filling data to the cache in accordance with a cache miss. When the queue engine 743 issues a command corresponding to the write request to the storage device 730, the address manager 741 may toggle (e.g., set from '0' to '1') a busy bit of a corresponding set in the tag array, and isolate target data from the cache by cloning a page at 0xE0 of the MoS address space into a PRP pool 721b allocated to a pinned memory region 721, in step S1240. Further, in step S1240, the address manager 741 may update a PRP value with a location of the cloned page to replace the reference to the PRP with the PRP pool 721b, and submit the PRP to the queue engine 743. As such, data consistency can be maintained during DMA between the memory 720 and the flash media 732 of the storage device, by updating the PRP with the PRP pool.

Next, as described with reference to FIG. 11, when the address manager 741 receives a request for a write at 0xF0, a cache miss may occur in step S1250. Then, in step S1260, the address manager 741 may realize that the data are in an eviction process by referring to the busy bit of the corresponding set in the tag array, and put the write request into a waiting queue 1102. In some embodiments, the waiting queue 1102 may be formed in the pinned memory region (721 of FIG. 9).

Accordingly, the queue engine 743 may include two commands corresponding to the write request (S1220) and the read request (S1230). In step S1290, the data (i.e., the data at 0xE0 of the MoS address space) copied to the PRP pool 721c may be evicted and written to the flash media 732 of the storage device 730 in accordance with the write request (S1120). At this time, since the write request (S1250) waits in the waiting queue 1102, the redundant eviction does not occur. Further, in step S1270, the controller 731 of the storage device may write the data stored in the flash media 732 of the storage device to 0xF0 of the MoS address space in accordance with the read request (S1230). At this time, since the write request (S1250) waits in the waiting queue 1102, the eviction hazard does not occur. Further, once the I/O service of the command according to the read request (S1230) is completed, the address manager 741 clears (i.e., sets from '1' to '0') the busy bit, and issues the write request that sits in the waiting queue 1102 to the queue engine 743 again, in step S1280. Since the data are stored in the cache in accordance with the read request (S1230), the cache hit occurs, and the data stored in the cache (i.e., the data at 0xF0 of the MoS address space) can be served.

Figure 13:
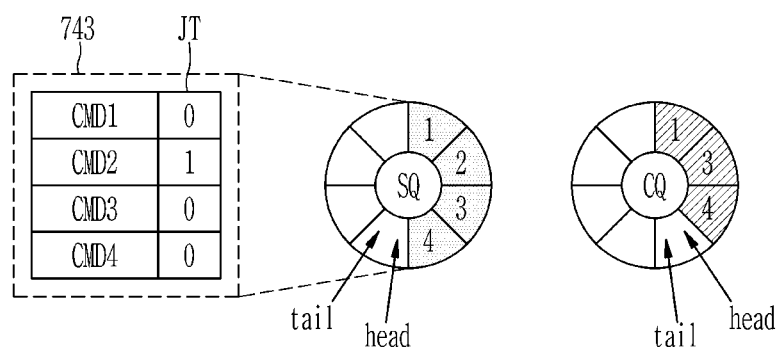
FIG. 13, FIG. 14, and FIG. 15 are drawings showing a power failure recovery procedure in a memory controlling device according to an embodiment of the present invention.
Figure 14:
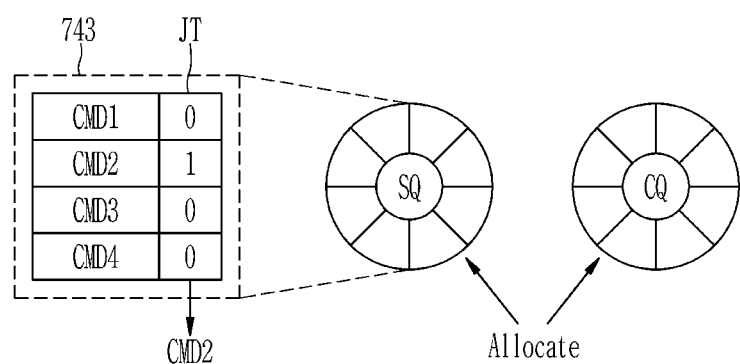
Figure 15:
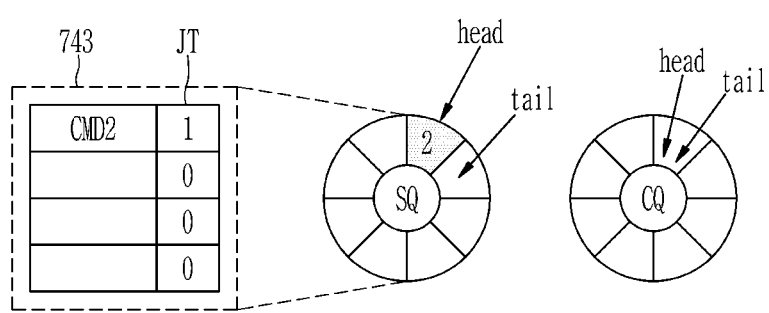

FIG. 13, FIG. 14, and FIG. 15 are drawings showing a power failure recovery procedure in a memory controlling device according to an embodiment of the present invention.

When a MoS address space is used as a working memory expansion, no significant overhead on queue management may be exposed. However, when the MoS address space is used as a storage device (or a persistent memory expansion), a guarantee for data persistency may be needed. For this, a memory controlling device (740 of FIG. 7) may be required to flush a command (e.g., an NVMe command) whenever a cache logic needs to update data in a storage device (730 of FIG. 7). To address this issue, in some embodiments, a journal tag may be added to an entry of a command to be issued to a queue engine (743 of FIG. 7). In one embodiment, the journal tag may be added to a reserved bit of an NVMe command structure. The journal tag may keep information that indicates whether the corresponding command is completed by the storage device 730. For example, whenever the queue engine 743 sends a command, i.e., a I/O request to the storage device 730, the journal tag may be set to a predetermined value (e.g., '1'). When an interrupt (e.g., an MSI) indicating the completion is arrived from the storage device 730, the journal tag of the command associated with the completion may be cleared (e.g. set to '0').

For example, referring to FIG. 13, four commands CMD1, CMD2, CMD3, and CMD4 in an SQ of the queue engine 743 are issued to the storage device 730, and a head pointer and tail pointer of the SQ refer to the same location (i.e., the fifth entry). The commands CMD1, CMD2, CMD3, and CMD4 are processed in the storage device 730, and the three commands CMD1, CMD3, and CMD4 among these commands are completed so that a head pointer and tail pointer of a CQ refer to the same location (i.e., the fourth entry). Accordingly, journal tags JT of the three commands CMD1, CMD3, and CMD4 are cleared to '0', but a journal tag JT of the uncompleted command CMD2 is still maintained to a set state, i.e., '1'. If a power failure occurs at this time, the storage device 730 and the memory controlling device 740 cannot complete the command CMD2.

Since a buffer 721a of a pinned memory region (721 of FIG. 9) holds data of the SQ, at the power restoration, the memory controlling device 740 first checks the buffer 721a of the pinned memory region 721 to determine whether there is any command whose journal tag JT is '1'. If there is the command CMD whose journal tag JT is '1', the memory controlling device 740 pulls the command CMD2 and allocates a new SQ and CQ for the I/O service as shown in FIG. 14.

Next, as shown in FIG. 15, the memory controlling device 740 issues the command CMD2 to the queue engine 743 to insert the command CMD2 into the new SQ. Accordingly, the queue engine 743 increases a tail pointer of the SQ and rings a doorbell register, so that the command CMD2 which is not completed at the moment of the power failure can be served.

Next, a memory controlling device of a computing device according to another embodiment of the present invention is described with reference to FIG. 16 to FIG. 18.

Figure 16:
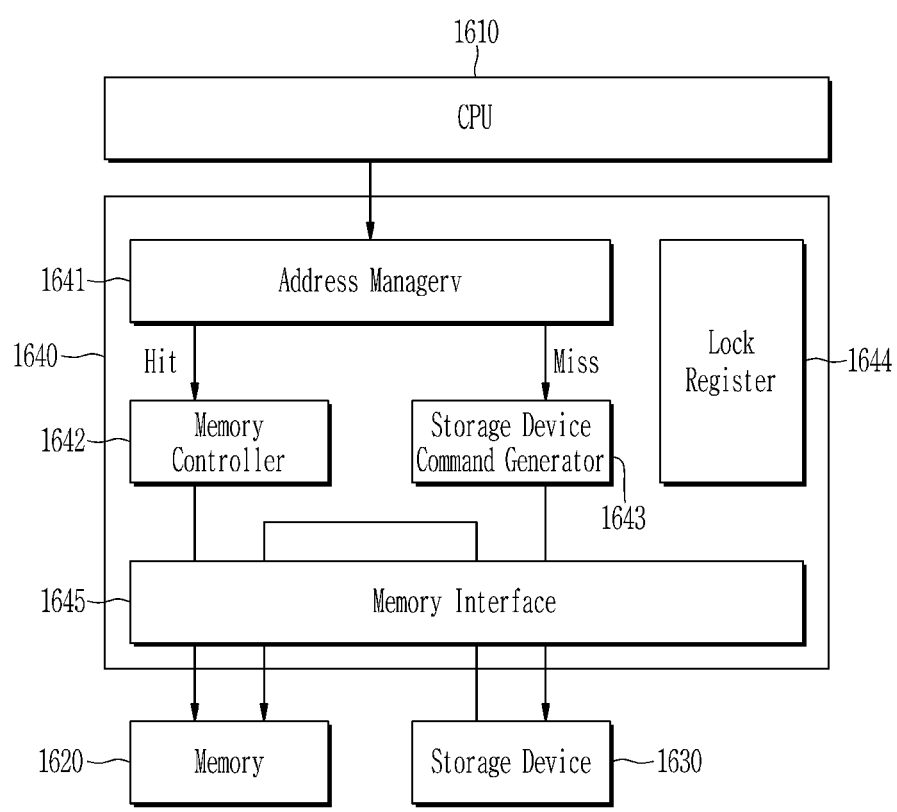
FIG. 16 is a schematic block diagram showing a computing device according to another embodiment of the present invention.
Figure 17:
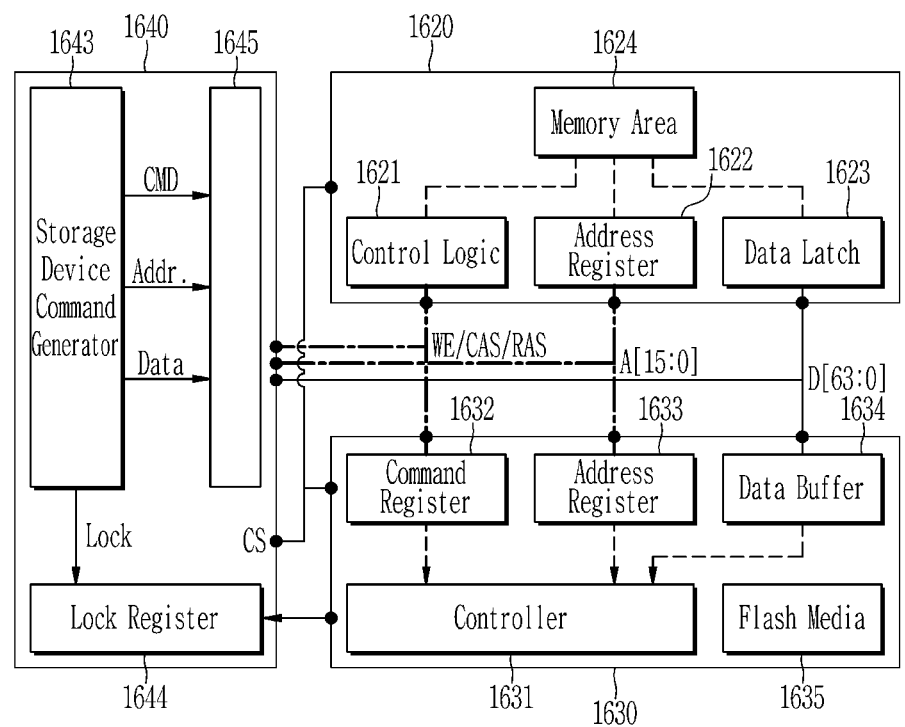
FIG. 17 is a drawing showing a register-based interface in a computing device according to another embodiment of the present invention.
Figure 18:
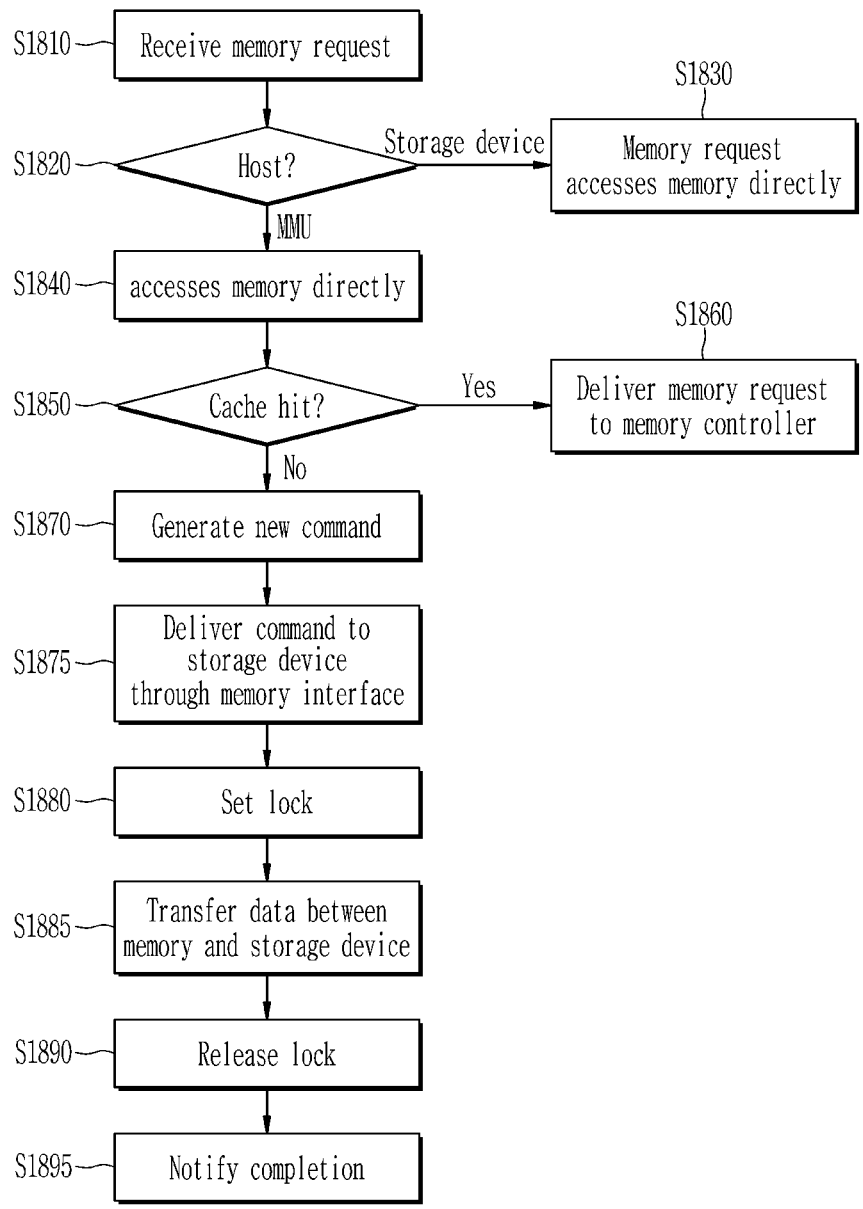
FIG. 18 is flowchart showing an operation of a memory controlling device according to another embodiment of the present invention.

FIG. 16 is a schematic block diagram showing a computing device according to another embodiment of the present invention, FIG. 17 is a drawing showing a register-based interface in a computing device according to another embodiment of the present invention, and FIG. 18 is flowchart showing an operation of a memory controlling device according to another embodiment of the present invention.

A memory controlling device 740 described with reference to FIG. 7 can offer a large working memory space by leveraging the conventional memory interface 744, for example, the conventional DDR interface and the conventional storage device interface 745, for example, the conventional PCIe interface. Such a memory controlling device 740 may not require any modification to the existing storage device 730 and the existing memory 720. However, in a case of a cache miss, target data go through the DDR module (e.g., the DDR controller and DDR interface) and the PCIe module (e.g., the root complex, transaction layer, data link layer and physical layer). The peak bandwidth of DDR, in particular, DDR4 is 19.2 GB/s per channel, but the storage device such as the SSD uses PCIe 3.0 with 4 lanes, which makes the peak bandwidth of NVMe 3.97 GB/s. Thus, whenever there is the cache miss, the performance of the memory controlling device 740 may be capped by the PCIe bandwidth. In addition, the data of the memory 720 may be encoded and encapsulated into a PCIe packet to be transferred to the storage device 730, which also makes the latency longer if there is the cache miss.

As such, the interface latency taken by moving data between the DDR controller and the NVMe controller of the storage device is long so that the performance of the memory controlling device may be degraded. In addition, even if the memory controlling device already holds data in the memory 720, a request may still be copied to a memory (e.g., a DRAM) within the storage device 730. This may significantly improve the performance under the block storage use-case, but may also introduce extra energy consumption and increase the internal complexity of the storage device 730. In particular, the internal DRAM of the storage device 730 may require more power than the flash media consisting of 32 flash chips.

To address these issues, according to another embodiment of the present invention, a new register-based interface may be instead of doorbell registers, and a storage device may be connected to a memory interface. In this case, flash media and its controller may be unleashed from the storage device and a data path may be directly connected to a memory. This approach may allow the storage device to access a memory area of the memory without any intervention from the memory controlling device, and remove the internal DRAM buffer from the storage device while enabling full functionality of the NVMe queues.

Specifically, referring to FIG. 16, a computing device 1600 according to another embodiment of the present invention includes a CPU 1610, a memory 1620, a storage device 1630, and a memory controlling device 1640. Descriptions of functions similar to those of a computing device 700 described with reference to FIG. 7 are omitted.

The memory controlling device 1640 includes an address manager 1641, a memory controller 1642, a storage device command generator 1643, and a lock register 1644. The memory controller 1642 and the storage device command generator 1643 are connected to the memory 1620 and the storage device 1630 via a memory interface 1645, respectively. Accordingly, the storage device 1630 can directly access the memory 1620 through the memory interface 1645. In one embodiment, the memory interface 1645 may be a DDR interface.

The address manager 1641 may control the storage device command generator 1643 to write a set of registers capturing source and destination addresses and an I/O command, based on an I/O request which the memory controlling device 1640 needs to initiate. Then, a controller of the storage device 1630, for example, an NVMe controller may fetch target data from the source address of the memory 1620 and forward the target data to an FTL of the storage device 730 so that the target data can be programmed to flash media.

In some embodiments, an interface used to manage an internal memory (e.g., a DRAM) in a general storage device (e.g., SSD) may be used as an interface between the memory 720 and the storage device 730. Then, the memory 720 can be accessed by both the storage device command generator 1643 and the controller of the storage device 1630.

Referring to FIG. 17, in some embodiments, the memory 1620 may include a control logic 1621, an address register 1622, a data latch 1623, and a memory area 1624, and the storage device 1630 may include a controller 1631, a command register 1632, an address register 1633, a data buffer 1634, and flash media 1635.

In some embodiments, the memory controlling device 1640 may be connected to the memory 1620 and the storage device 1630 by a register-based interface. A pin (e.g., WE (Write Enable) pin) for transferring a command in the memory interface 1645 may be connected to a pin of the control logic 1621 and a pin of the command register 1632 via a bus. A CAS (Column Address Strobe) signal and an RAS (Row Address Strobe) signal in addition to a WE signal may be transferred through the WE pin. A pin for transferring an address A[15:0] in the memory interface 1645 may be connected to a pin of the address register 1622 and a pin of the address register 1633 via a bus. A pin for transferring data D[63:0] in the memory interface 1645 may be connected to a pin of the data latch 1623 and a pin of the data buffer 1634.

Referring to FIG. 17 and FIG. 18, when a lookup result of a cache logic is a cache miss in step S1850, the address manager 1641 forwards a memory request to the storage device command generator 1643 to allow the storage device command generator 1643 to generate a new command based on the memory request in step S1870. Since steps S1810, S1820, S1830, S1840, S1850, and S1860 in FIG. 15 perform the same operations as steps S810, S820, S830, S840, S850, and S860 described with reference FIG. 8, their descriptions are omitted.

In step S1875, the storage device command generator 1643 generates a source address, a destination address, and a command (e.g., an I/O command) indicating a request type and deliver them to the storage device 1630 through the memory interface 1645. For example, when the memory interface 1645 is a DDR interface, the source address may be delivered through an address signal at RAS signal timing (tRAS), and the destination address may be delivered through the address signal at CAS signal timing (tCAS). The RAS signal and CAS signal may be delivered based on a clock period defined by the DDR interface. Further, the command may indicate a read or a write, and may be delivered through a WE signal. In some embodiments, a pair of the source and destination addresses may correspond to a pair of a memory address (e.g., a PRP) and a storage device address (e.g., an LBA). For example, when data are read from the storage device 1630 and written to the memory 1620 in accordance with the memory request, the source address may be the storage device address and the destination address may be the memory address. When data are read from the memory 1620 and written to the storage device 1630 (i.e., data are evicted from the memory 1620) in accordance with the memory request, the source address may be the memory address and the destination address may be the storage device address.

In some embodiments, as described with reference to FIG. 8 to FIG. 10, when the memory request is a read request, the storage device command generator 1643 may generate two I/O commands. The two I/O commands may include a read command that evicts data from the memory 1620, i.e., a cache memory region (722 of FIG. 9) of the memory and writes the data to the storage device 1630, and a write command that reads data from the storage device 1630 and fills the data into the memory 1620, i.e., the cache memory region 722 of the memory. In one embodiment, the source address and destination address delivered along with the read command may correspond to the memory address and the storage device address, respectively. The memory address (PRP) may correspond to a memory address stored in a set corresponding to an array index of the memory request, and the storage device address (LBA) may correspond to a storage device address which is generated based on the array index of the memory request and a tag stored in the set corresponding to the array index. The source address and destination address delivered along with the write command may correspond to the storage device address and the memory address, respectively. The memory address (PRP) may correspond to a memory address stored in a set corresponding to an array index of the memory request, and the storage device address (LBA) may correspond to an address of the memory request. When the memory request is a write request, the storage device command generator 1643 may generate a read command as the I/O command. The read command may be a command that evicts data from the memory 1620, i.e., the cache memory region 722 of the memory and writes the data to the storage device 1630

In one embodiment, the source address and destination address delivered along with the read command may correspond to the memory address and the storage device address, respectively. The memory address (PRP) may correspond to a memory address stored in a set corresponding to an array index of the memory request, and the storage device address (LBA) may correspond to a storage device address which is generated based on the array index of the memory request and a tag stored in the set corresponding to the array index.

The storage device 1630 may further include a command register 1632 and an address register 1633. The command register 1632 may store the command delivered from the memory controlling device 1640, for example, the WE signal, and the address register 1633 may store the source and destination addresses delivered from the memory controlling device 1640, for example, strobe signals such as the RAS and CAS signals.

After the command and addresses are delivered to the storage device 1630 (that is, after a given number of cycles for the command and addresses), the storage device command generator 1643 of the memory controlling device 1640 may set the lock register 1644 to a value corresponding to lock (e.g., '1') in step S1880. Since the memory 1620 may be accessed by both the controller 1631 of the storage device 1630, for example, the NVMe controller and the memory controlling device 1640, the lock register 1644 can prevent the memory 1620 from being accessed at the same time. Setting the lock register 1644 may indicate that the controller 1631 of the storage device 1630 takes over a control as a bus master. Accordingly, the controller 1631 can access memory 1620 based on memory timing of the memory interface 1645, for example, the DDR interface. Further, the memory controlling device 1640 can be blocked from accessing the memory 1620.

When the request type of the command is a read, the controller 1631 of the storage device 1630 may initiate communication with the memory 1620 immediately. The controller 1631 may write a read command to the control logic 1621 of the memory 1620 in accordance with the request type (i.e., the read) recorded in the command register 1632, and may write the memory address (i.e., the source address) recorded in the address register 1633 to the address register 1622 of the memory 1620. Thus, data corresponding to the memory address, which are read from the memory area 1624 of the memory 1620, can be transferred from the data latch 1623 of the memory 1620 to the data buffer 1634 of the storage device 1630. Then, the controller 1631 can write the data stored in the data buffer 1634 to the flash media 1635.

When the request type of the command is a write, the controller 1631 may initiate the communication with the memory 1620 after a corresponding read service is completed in the flash media of the storage device 1630. The controller 1631 may write a write command to the control logic 1621 of the memory 1620 in accordance with the request type (i.e., the write) recorded in the command register 1632, and may write the memory address (i.e., the destination address) recorded in the address register 1633 to the address register 1622 of the memory 1620. Thus, data, which are read from the flash media 1635 and then stored in the data buffer 1634, can be transferred to the data latch 1623 of the memory 1620 and then written in the memory area 1624 of the memory 1620.

After the data transfer between the memory 1620 and the storage device 1630 is completed in step S1885, the controller 1631 releases the lock register 1644. In other words, the controller 1631 may set the lock register 1644 to a value corresponding to a lock release (e.g., '0') in step S1890. As such, using the lock register 1644 can avoid a case that both the controller 1631 of the storage device 1630 and the memory controller 1642 of the memory controlling device 1640 use the bus at the same time. Although this register-based interface can reduce the overhead involved in data transfers, a time period during which the lock register 1644 is set may be required to be minimized Since the latency of the flash media 1635 is relatively longer than the latency of the memory 1620, the controller 1631 may use the data buffer 1634 such as data and cache registers for the data transfer, instead of waiting for the entire latency of flash transactions.

Once the data transfer is completed, the memory controlling device 1600 may inform the MMU of the completion through a memory system bus (e.g., an AXI) so that the MMU can retry the stalled instruction in step S1895.

Referring to FIG. 17 again, in some embodiments, a pin for functioning the memory 1620 and the storage device 1630, e.g., CS (Chip Select) pin may be used. Either a master or a slave may be determined by a value of a CS signal delivered through the CS pin. In one embodiment, in a case where the memory controlling device 1640 own the lock (that is, the lock register 1644 is set to the lock release), if the CS pin of the memory 1620 is set to an enabling value (e.g., '1') and the CS pin of the storage device 1630 is set to a disabling value (e.g., '0'), the memory controlling device 1640 may operate as the master and the memory 1620 may operate as the slave. In other words, the memory controlling device 1640 can access the memory 1620. In a case where the memory controlling device 1640 own the lock, if the CS pin of the memory 1620 is set to '0' and the CS pin of the storage device 1630 is set to '1', the memory controlling device 1640 may operate as the master and the storage device 1630 may operate as the slave. In other words, the memory controlling device 1640 can access the storage device 1630. In a case where the storage device 1630 takes over the lock (that is, the lock register 1644 is set), if the memory controlling device 1640 sets the CS pin of the memory 1620 to '1', the storage device 1630 may operate as the master and the memory 1620 may operate as the slave. In other words, the storage device 1630 can access the memory 1620.

As described above, according to another embodiment of the present invention, the memory capacity of the memory and the storage capacity of the storage device can be aggregated into expanded memory space, and the expanded memory space can be used as the working memory expansion or the persistent memory expansion. In some embodiments, the overhead imposed by the data transfer can be removed by the register-based interface, and the energy inefficiency brought by the internal DRAM of the storage device can be improved by removing the internal DRAM. In some embodiments, the expanded memory space can be aggregated without assistance of software, through hardware automation using the hardware cache logic and the like.

Next, results measured after implementing a memory controlling device according to an embodiment of the present invention on real hardware are described. To measure the performance, a main memory in a gem5 simulator proposed by Binkert et al. is replaced with an 8 GB DRAM-based NVDIMM, and a 800 GB ULL-Flash prototype is used as a storage device. A detailed specification is shown as in Table 1.

TABLE 1

| Components | Specification |
| --- | --- |
| OS | Linux 4.9, Ubuntu 14.10 |
| CPU | quad-core, 2 GHz |
| Memory | NVDIMM, DDR4, 8 GB |
| Storage device | ULL-Flash, PCIe 3.0 × 4, 800 GB |
| Flash | 3 μs read, 100 μs write |

In this case, the memory controlling device described with reference to FIG. 7 and the memory controlling device described with reference to FIG. 16 improve MIPS (million instructions per second) by 97% and 119%, respectively, compared to the conventional hybrid design of the memory and storage device based on MMF (i.e., based on software), while saving 41% and 45% system energy in execution of data-intensive applications.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A memory controlling device of a computing device including a central processing unit (CPU), a memory, and a flash-based storage device, the memory controlling device comprising:
    an address manager that aggregates a memory space of the memory and a storage space of the storage device into an expanded memory space, and handles a memory request for the expanded memory space from the CPU by using the memory space of the memory as a cache for the storage space of the storage device;
    an interface that is used to access the memory and the storage device; and
    a queue engine,
    wherein the address manager aggregates the memory space of the memory and the storage space of the storage device into the expanded memory space by using a cache logic that lookups a hit or a miss in the cache based on the address of the memory request,
    wherein the interface includes a memory interface for the memory and a storage device interface for the storage device,
    wherein when the memory request is a miss in the cache, the address manager generates a command having a command structure for the storage device based on the memory request and forwards the command to the queue engine, and the queue engine delivers the command to the storage device through the storage device interface, and
    wherein when the memory request is a hit in the cache, the address manager pulls a memory address of the memory corresponding to the address of the memory request from the cache logic, and delivers the memory request having the memory address to the memory.

2. The memory controlling device of claim 1, wherein the address of the memory request is an address of a main memory which uses a capacity of the storage space as a capacity of a memory space of the main memory, and
    wherein the address manager handles the memory request by mapping the storage space of the storage device to the memory space of the memory.

3. The memory controlling device of claim 1, wherein the address manager aggregates the memory space of the memory and the storage space of the storage device into the expanded memory space without assistance of software, by using a hardware cache logic as the cache logic.

4. The memory controlling device of claim 1, wherein the queue engine delivers the command to the storage device by submitting the command to a submission queue and ringing a doorbell register.

5. The memory controlling device of claim 1, wherein when the memory request is a read request, the command includes a first command that evicts cache data from the memory to the storage device and a second command that reads target data from the storage device to the memory, and wherein when the memory request is a write request, the command includes the first command that evicts the cache data from the memory to the storage device.

6. The memory controlling device of claim 5, wherein the first command includes a pointer indicating a memory address stored in a set corresponding to the address of the memory request among a plurality of sets in the cache logic, and an address indicating a storage device address which is generated based on the address of the memory request and a value stored in the set corresponding to the address of the memory request, and
    wherein the second command includes the pointer indicating the memory address stored in the set corresponding to the address of the memory request, and an address indicating a storage device address corresponding to the address of the memory request.

7. The memory controlling device of claim 1, wherein the memory includes a pinned memory region in which the cache logic is stored.

8. A computing device comprising:
    the memory controlling device of claim 1;
    the CPU;
    the memory; and
    the storage device.

9. A memory controlling device of a computing device including a central processing unit (CPU), a memory, and a flash-based storage device, the memory controlling device comprising:
    an address manager that aggregates a memory space of the memory and a storage space of the storage device into an expanded memory space, and handles a memory request for the expanded memory space from the CPU by using the memory space of the memory as a cache for the storage space of the storage device;
    an interface that is used to access the memory and the storage device; and
    a storage device command generator that generates a command for the storage device to directly access the memory based on the memory request when the memory request is a miss in the cache,
    wherein the address manager aggregates the memory space of the memory and the storage space of the storage device into the expanded memory space by using a cache logic that lookups a hit or a miss in the cache based on the address of the memory request,
    wherein the interface includes a memory interface,
    wherein the memory interface is connected to a register of the memory and a register of the storage device by a register-based interface, and
    wherein the storage device command generator delivers the command to the storage device through the memory interface so that the storage device directly accesses the memory through the register-based interface.

10. The memory controlling device of claim 9, wherein the command includes a source address, a destination address, and a request type, wherein the source address indicates one of a memory address of the memory and a storage device address of the storage device, the destination address indicates another of the memory address and the storage device address, and the request type indicates a read or a write, and wherein data are transferred from the source address to the destination address in accordance with a control of a controller of the storage device.

11. The memory controlling device of claim 9, further comprising a lock register that is set when the command is delivered to the storage device, wherein when the lock register is set, the memory controlling device is blocked from accessing the memory.

12. A memory controlling device of a computing device including a central processing unit (CPU), a memory, and a flash-based storage device, the memory controlling device comprising:
    an address manager that aggregates a memory space of the memory and a storage space of the storage device into an expanded memory space, and handles a memory request for the expanded memory space from the CPU by using the memory space of the memory as a cache for the storage space of the storage device;

an interface that is used to access the memory and the storage device, wherein the address manager aggregates the memory space of the memory and the storage space of the storage device into the expanded memory space by using a cache logic that lookups a hit or a miss in the cache based on the address of the memory request, wherein when the memory request is a miss in the cache, a command is delivered to the storage device so that the memory request is processed in the storage device and the memory, wherein the command includes a journal tag, and wherein the journal tag is set to a first value when the command is delivered to the storage device, and the journal tag is set to a second value when the command is completed in the storage device.

13. A memory controlling device of a computing device including a central processing unit (CPU), a memory, and a flash-based storage device, the memory controlling device comprising:

an address manager that aggregates a memory space of the memory and a storage space of the storage device into an expanded memory space, and handles a memory request for the expanded memory space from the CPU by using the memory space of the memory as a cache for the storage space of the storage device; and an interface that is used to access the memory and the storage device, wherein the address manager aggregates the memory space of the memory and the storage space of the storage device into the expanded memory space by using a cache logic that lookups a hit or a miss in the cache based on the address of the memory request, wherein the cache logic includes a plurality of sets that correspond to a plurality indices, respectively, wherein each set includes a tag, wherein an address of the memory request is decomposed into at least a targettag and a target index, and wherein the address manager determines a hit when the tag stored in a set having a same index as the target index among the plurality of sets is equal to the target tag, and determines a miss when the stored tag is different from the target tag.

14. The memory controlling device of claim 13, wherein each set further includes a busy bit indicating whether a corresponding cache region is in use, and wherein when cache data are evicted from the memory to the storage device in accordance with the miss of the memory request, the address manager sets the busy bit of a target set corresponding to the address of the memory request among the plurality of sets to a predetermined value, copies the cache data to a predetermined region of the memory, and updates a pointer for evicting the cache data to point the predetermined region.

15. The memory controlling device of claim 14, wherein when a write request to a cache region corresponding to the target set is received from the CPU, the address manager refers to the busy bit of the target set, allows the write request to wait when the busy bit is the predetermined value, and processes the write request after eviction of the cache data is completed in the predetermined region.

16. A memory controlling device of a computing device including a central processing unit (CPU), a memory, and a flash-based storage device, the memory controlling device comprising:

an address manager that aggregates a memory space of the memory and a storage space of the storage device into an expanded memory space, and handles a memory request for the expanded memory space from the CPU by using the memory space of the memory as a cache for the storage space of the storage device;

a queue engine that manages a queue for the storage device;

a memory interface for the memory; and a storage device interface for the storage device, wherein the address manager uses a cache logic that lookups a hit or a miss in the cache based on an address of the memory request, wherein when the memory request is the hit, the address manager delivers the memory request to the memory through the memory interface based on an entry of the cache logic corresponding to the address of the memory request, and wherein when the memory request is the miss, the address manager generates a command having a command structure for the storage device from the memory request based on an entry of the cache logic corresponding to the address of the memory request, and the queue engine delivers the command to the storage device through the storage device interface.

17. The memory controlling device of claim 16, wherein the address manager aggregates the memory space of the memory and the storage space of the storage device into the expanded memory space without assistance of software, by using a hardware cache logic as the cache logic.

18. A memory controlling device of a computing device including a central processing unit (CPU), the memory controlling device comprising:

a memory including a first register and a memory area;

a storage device including a second register and flash media;

an address manager that aggregates a memory space of the memory and a storage space of the storage device into an expanded memory space, and handles a memory request for the expanded memory space from the CPU by using the memory space of the memory as a cache for the storage space of the storage device;

a storage device command generator; and a memory interface that is an interface for the memory and is connected to the first register and the second register by a register-based interface, wherein the address manager uses a cache logic that lookups a hit or a miss in the cache based on an address of the memory request, wherein when the memory request is the hit, the address manager delivers the memory request to the memory through the memory interface based on an entry of the cache logic corresponding to the address of the memory request, and wherein when the memory request is the miss, the address manager generates a command for the storage device to directly access the memory based on an entry of the cache logic corresponding to the address of the memory request, and delivers the command to storage device through the register-based interface so that the storage device directly accesses the memory through the register-based interface.

19. The memory controlling device of claim 18, wherein the address manager aggregates the memory space of the memory and the storage space of the storage device into the expanded memory space without assistance of software, by using a hardware cache logic as the cache logic.

20. A memory controlling device of a computing device including a central processing unit (CPU), a memory module, and a flash-based storage device, the memory module including a volatile memory and a non-volatile memory, the memory controlling device comprising:
- an address manager that aggregates a memory space of the memory module and a storage space of the storage device into an expanded memory space, and handles a memory request for the expanded memory space from the CPU and offers an addressable address space by exposing the storage capacity of the storage device to the CPU and using the memory space of the memory module including the volatile memory and the non-volatile memory as a cache for the storage space of the storage device;
- an interface that is used to access the memory module and the storage device; and wherein the memory space of the memory module including the volatile memory and the non-volatile memory is not offered to the CPU as the addressable address space.

* * * * *